US008321573B2

(12) United States Patent
Hirao et al.

(10) Patent No.: US 8,321,573 B2
(45) Date of Patent: Nov. 27, 2012

(54) COMMUNICATIONS TERMINAL WITH OPTIMUM SEND INTERVAL

(75) Inventors: Keiji Hirao, Osaka (JP); Motoe Sakanaka, Osaka (JP); Tomohiro Yamada, Hyogo (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1381 days.

(21) Appl. No.: 11/663,068

(22) PCT Filed: Sep. 1, 2005

(86) PCT No.: PCT/JP2005/016476
§ 371 (c)(1),
(2), (4) Date: Mar. 16, 2007

(87) PCT Pub. No.: WO2006/030679
PCT Pub. Date: Mar. 23, 2006

(65) Prior Publication Data
US 2008/0034123 A1    Feb. 7, 2008

(30) Foreign Application Priority Data
Sep. 17, 2004   (JP) ................................ 2004-271247

(51) Int. Cl.
G06F 15/16    (2006.01)
(52) U.S. Cl. ...................................... 709/229
(58) Field of Classification Search ............... 709/229
See application file for complete search history.

(56) References Cited

U.S. PATENT DOCUMENTS 4,745,593 A * 5/1988 Stewart .......................... 370/244
5,642,352 A * 6/1997 Ishida et al. .................. 370/401
(Continued)

FOREIGN PATENT DOCUMENTS
JP    2002-354048    12/2002
(Continued)

OTHER PUBLICATIONS

The Open Group. "Systems Management: Application Response Measurement (ARM) API." Jul. 1998. Revtreived from the Internet on Apr. 15, 2010. <URL: http://www.opengroup.org/onlinepubs/009619299/toc.pdf>.*

(Continued)

*Primary Examiner* — Joseph Avellino
*Assistant Examiner* — James Baron
(74) *Attorney, Agent, or Firm* — Kratz, Quintos & Hanson, LLP

(57) ABSTRACT

A communication terminal includes a CPU (28). The CPU (28) issues to a router (16) a send request for requesting the router (16) to send an ask signal for repetitive responses to a server (14). Then, the ask signal is sent to the server (14) by the router (16), and a receive port is temporarily opened. From the server (14), a response signal is repeatedly sent in response to the ask signal. To the response signal, time information representative of a waiting time from receiving an ask signal to its reply is attached. A response signal sent back while the receive port is opened arrives at the communication terminal through the router (16), but a response signal sent back after the receive port is closed is discarded in the router (16). The CPU (28) repeatedly issues a send request to the router (16) regarding a time indicated by time information attached to the response signal lastly received as an issuance cycle (T).

14 Claims, 23 Drawing Sheets

U.S. PATENT DOCUMENTS

| | | | | |
|---|---|---|---|---|
| 6,003,083 A * | 12/1999 | Davies et al. | 709/226 |
| 6,058,102 A * | 5/2000 | Drysdale et al. | 370/252 |
| 6,078,943 A * | 6/2000 | Yu | 718/105 |
| 6,917,971 B1 * | 7/2005 | Klein | 709/224 |
| 7,007,092 B2 * | 2/2006 | Peiffer | 709/227 |
| 7,284,051 B1 * | 10/2007 | Okano et al. | 709/226 |
| 7,475,108 B2 * | 1/2009 | Di Giulio et al. | 709/203 |
| 7,822,864 B2 * | 10/2010 | Matsushima | 709/229 |
| 2003/0115368 A1 * | 6/2003 | Wu | 709/251 |
| 2003/0145236 A1 * | 7/2003 | Tateoka | 713/201 |
| 2004/0010617 A1 * | 1/2004 | Akahane et al. | 709/243 |
| 2005/0138626 A1 * | 6/2005 | Nagami et al. | 718/105 |
| 2005/0147028 A1 * | 7/2005 | Na et al. | 370/217 |
| 2006/0234644 A1 * | 10/2006 | Ludwig et al. | 455/69 |
| 2009/0013069 A1 * | 1/2009 | Gobara et al. | 709/224 |
| 2009/0034547 A1 * | 2/2009 | Choi et al. | 370/410 |
| 2009/0077233 A1 * | 3/2009 | Kurebayashi et al. | 709/224 |

FOREIGN PATENT DOCUMENTS

| | | |
|---|---|---|
| JP | 2004-158923 | 6/2004 |
| JP | 2004-166031 | 6/2004 |
| WO | WO 2004/030292 A1 | 4/2004 |

OTHER PUBLICATIONS

The Open Group. "Application Resource MEasurement (ARM) Issue 4, Version 2—Java Binding." ©2004. Retrieved from the Internet. <URL: https://www2.opengroup.org/ogsys/protected/publications/viewDocument.html?publicationid=11127&documentid=10795>.*

* cited by examiner

FIG. 2
(A)
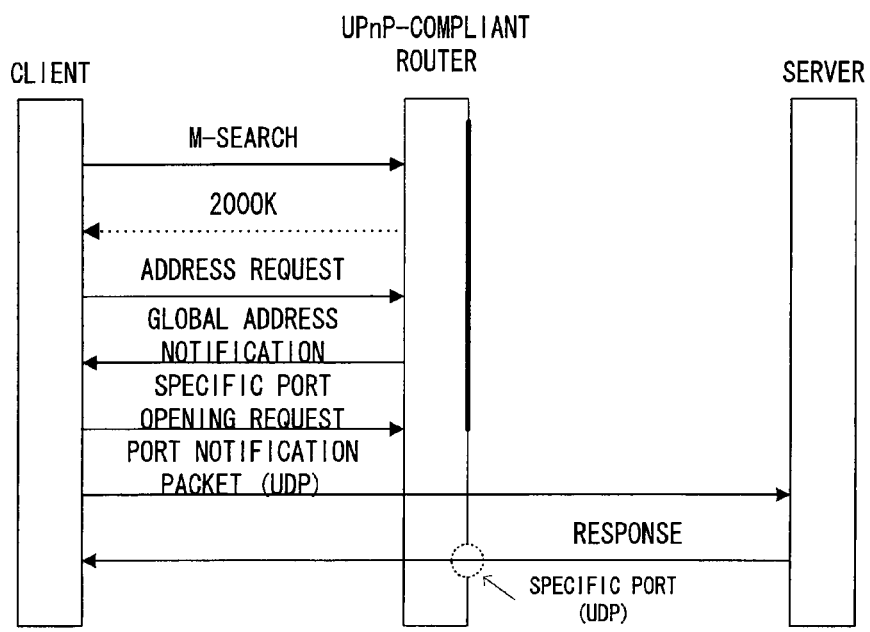
(B)
PORT NOTIFICATION PACKET (UDP)
| HEADER AREA | DATA AREA: SPECIFIC PORT NUMBER |
|---|---|
(C)
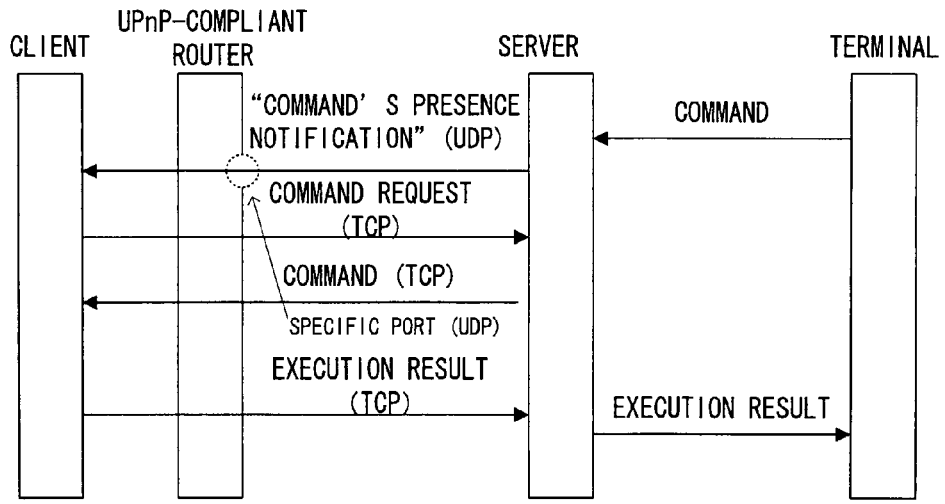

FIG. 3
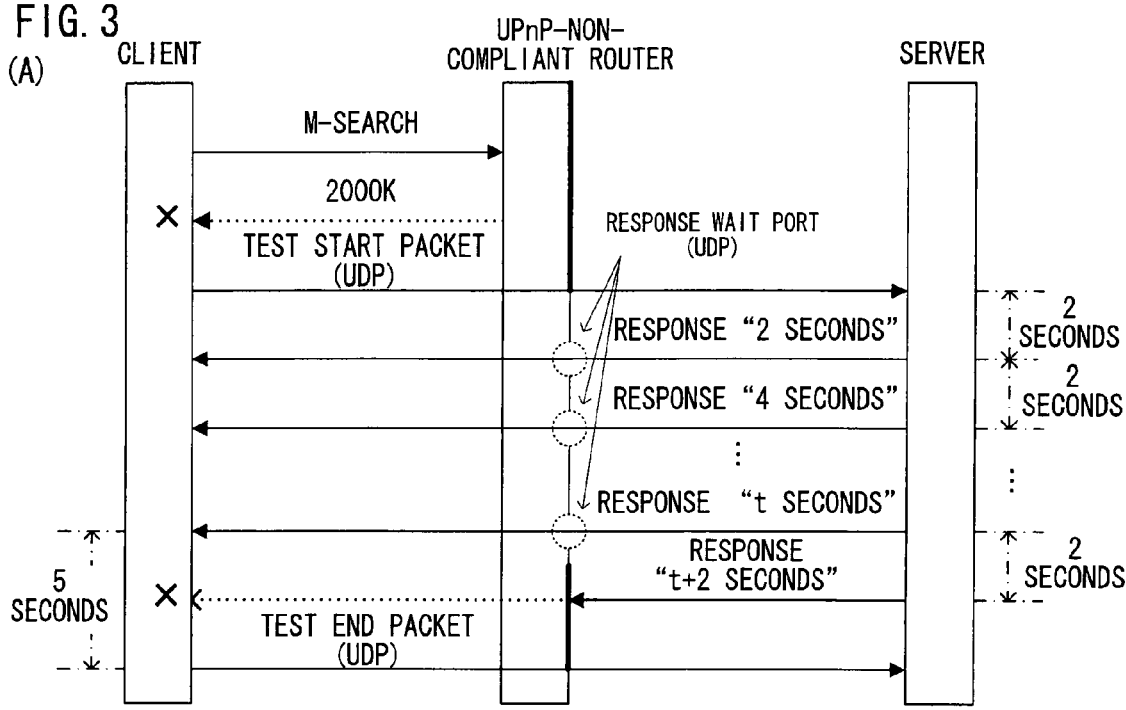
(A)
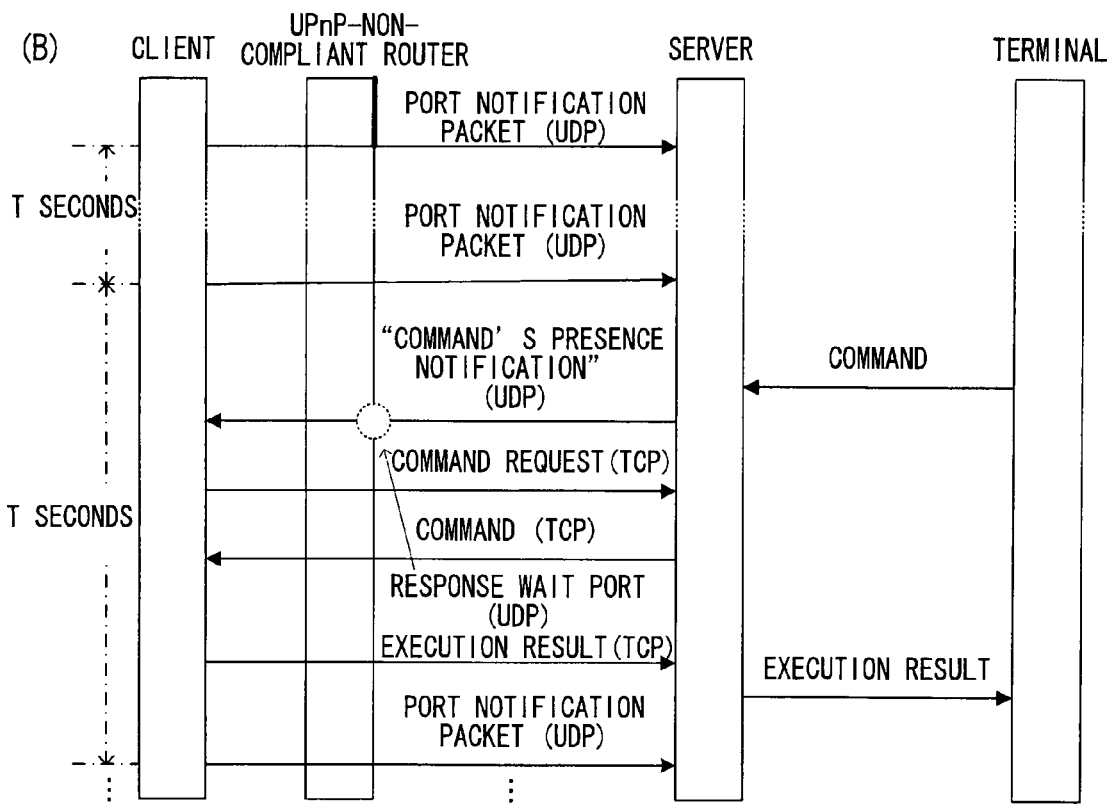
(B)
(C) PORT NOTIFICATION PACKET (UDP)
| HEADER AREA | DATA AREA : 0 | ium
COMMUNICATIONS TERMINAL WITH OPTIMUM SEND INTERVAL

TECHNICAL FIELD

The present invention relates to a communication terminal. More specifically, the present invention relates to a communication terminal to be connected with a router which performs, when a send request is issued, transmission processing according to the request, and temporarily opens a receive port.

PRIOR ART

Conventionally, the communication terminal of such a kind generally issues to a router a send request to request the router to send to the external server an ask signal for requesting a response. Then, an ask signal is sent to the external server by the router, and a receive port is temporarily opened. A response signal is sent back from the external server. The communication terminal receives the response signal sent back from the external server through the opened receive port.

According to the related art, the external server sends back a signal including a command, and whereby, the communication terminal can accept the command from the external server.

However, in the related art, the command cannot be accepted only when the receive port is opened. If a send request is frequently issued, it is possible to make a state in which the receive port is continuously opened, resulting in excessive load on the communications line.

SUMMARY OF THE INVENTION

Therefore, it is a primary object of the present invention to provide a novel communication terminal.

Another object of the present invention is to provide a communication terminal capable of making a state in which a receive port is continuously opened while minimizing load on a communications line.

A communication terminal connected to a router, when a send request is issued, for performing a transmission process in accordance with the request and temporarily opening a receive port, comprises a first issuing means for issuing to the router a send request to request the router to send an ask signal for asking a repetitive response to an external server; a receiving means for receiving a response signal from the external server through the receive port in response to the send request issued by the first issuing means; and a determining means for determining an issuance cycle of the send request on the basis of the reception result by the receiving means.

A first issuing means issues to the router a send request to request the router to send an ask signal for asking a repetitive response to an external server. When such a send request is issued, an ask signal for requesting a repetitive response is sent to the external server by the router, and a receive port is temporarily opened. From the external server, a response signal is repeatedly sent back. The response signal sent back is received by a receiving means through the opened receive port.

The receive port opened when the first issuing means issues a send request is closed after a lapse of a constant time period. When the receive port is closed, the receiving means does not receive a response signal thereafter, and therefore, it is possible to know a period during which the router opens the receive port (port opening period) when a send request is issued on the basis of the receiving result by the receiving means, capable of, in turn, determining an optimal issuance cycle of a send request.

A determining means determines an issuance cycle of the send request on the basis of the reception result by such a receiving means. If the first issuing means issues a send request at a cycle thus determined, the longest cycle within the port opening period, that is, a cycle equal to or slightly shorter than the port opening period, it is possible to make a state in which the receive port is continuously opened, while minimizing a load on the communications line.

In an embodiment the response signal includes time information representative of a time from a request receiving time to a response transmitting time, and the determining means determines the issuance cycle on the basis of time information included in a response signal lastly received by the receiving means.

The time information included in the lastly received response signal represents the longest time within the port opening period, that is, a time equal to or slightly shorter than the port opening period. Thus, by referring to the time information included in the lastly received response signal, it is possible to simply and appropriately determine an issuance cycle.

An embodiment further comprises a second issuing means for issuing to the router a send request to request the router to send an ask signal for asking a stop of a repetitive response to the external server after the determination by the determining means.

After the determination by the determining means is made, a second issuing means issues a send request. Then, an ask signal for asking stop of the repetitive response is sent to the external server from the router, and the repetitive return of the response signal by the external server is stopped.

After determination of the issuance cycle, the repetitive sending back of the response signal is stopped, and therefore, it is possible to reduce a load on a communications line due to a response signal.

An embodiment further comprises a suspending means for suspending the issuing operation by the first issuing means when a communication channel with the external server is disconnected.

The issuing operation by first issuing means is suspended by the suspending means when the communication channel between the external server and the communication terminal is disconnected. Thus, it is possible to cancel a state in which the receive port is continuously opened. Thus, the receive port is closed after completion of the communication with the external server, whereby, it is possible to prevent unauthorized access.

An embodiment is a communication terminal connected to a router, when a send request is issued, for performing a transmission process in accordance with the request and temporarily opening a receive port comprises: a first issuing means for repeatedly issuing to the router a send request to request the router to send an ask signal for asking a response at timings different from each other to an external server; a receiving means for receiving a response signal from the external server through the receive port in response to the send request issued by the first issuing means; and a determining means for determining an issuance cycle of the send request on the basis of the reception result by the receiving means.

A first issuing means repeatedly issues to the router a send request to request the router to send an ask signal for asking a response at timings different from each other to an external server. Every time that the first issuing means issues a send request, an ask signal for asking a response at timings different from each other is sent to the external server by the router, and the receive port is temporarily opened. Every time that a send request is issued by the first issuing means, a response signal is sent back at timings different from each other from the external server.

The receive port opened when the first issuing means issues a send request is closed after a lapse of the constant time period. Out of the response signals sent back at timings different from each other, a response signal sent back at timing later than the timing when the receive port is closed is not received by the receiving means. Thus, it is possible to know a period during which the router opens the receive port (port opening period) when a send request is issued on the basis of the receiving result by the receiving means, capable of, in turn, determining an optimal issuance cycle of a send request.

A determining means determines an issuance cycle of the send request on the basis of the reception result by the receiving means. If the first issuing means issues a send request at a cycle thus determined, the longest cycle within the port opening period, that is, a cycle equal to or slightly shorter than the port opening period, it is possible to make a state in which the receive port is continuously opened, while minimizing a load on communications line.

An embodiment further comprises an updating means for updating a response timing asked by the ask signal so as to be directed to a lengthening or shortening direction.

An updating means updates a response timing asked by the ask signal so as to be directed to a lengthening or shortening direction. Thus, the response timing in response to send requests repeatedly issued is simply changed in a shortening direction or a lengthening direction.

In an embodiment the updating direction by the updating means is the lengthening direction, and the determining means determines the issuance cycle on the basis of a response signal lastly received by the receiving means.

Every time that a send request is issued, response timing in response to a send request becomes gradually late. Thus, the receiving means repeatedly receives a response signal at a certain point, but does not receive a response signal after the certain point. The response timing of the response signal lastly received represents the longest time within the port opening period, and therefore, it is possible to adequately determine an issuance cycle on the basis of the lastly received answer signal.

An embodiment further comprises a reducing means for reducing an update interval by the updating means when a state in which a response signal is not received by the receiving means continues for a predetermined time.

Thus, determination accuracy of an issuance cycle of a send request is improved, and consequently, it is possible to minimize a load on the communications line.

In an embodiment the update direction by the updating means is the shortening direction, and the determining means determines the issuance cycle on the basis of a response signal first received by the receiving means.

Every time that a send request is issued, a response timing in response to the send request is gradually fast. Thus, the receiving means does not receive a response signal at a certain point, but repeatedly receives a response signal after the certain point. The response timing of the response signal first received represents the longest time within the port opening period, and therefore, it is possible to adequately determine an issuance cycle on the basis of the answer signal first received.

An embodiment further comprises a reducing means for reducing the update interval of the updating means when a response signal is first received by the receiving means.

Thus, determination accuracy of an issuance cycle of a send request is improved, and it is possible to minimize a load on the communications line.

In an embodiment the response signal includes time information representative of a time from a request receiving time to a response transmitting time, and the determining means determines the issuance cycle on the basis of the time information.

The time information included in the response signal represents a time from a request receiving time to a response transmitting time, that is, response timing. Thus, by referring to the time information included in the received answer signal, it is possible to easily determine the issuance cycle.

An embodiment further comprises a second issuing means for issuing to the router a send request to request the router to send an ask signal for asking stop of a response to the external server after the determination by the determining means.

After the determination is made by the determining means, a second issuing means issues a send request. Then, an ask signal for asking stop of a response is sent back to the external server from the router, and the sending of the response signal by the external server is stopped.

After the issuance cycle is determined, the return of the answer signal is stopped, capable of reducing a load on a communications line due to a response signal.

An embodiment further comprises a suspending means for suspending the issuing operation by the first issuing means when a communication channel with the external server is disconnected.

The issuing operation by the first issuing means is suspended by a suspending means when a communication channel between the external server and the communication terminal is disconnected. Thus, it is possible to cancel a state in which the receive port is continuously opened. Thus, the receive port is closed after completion of the communication with the external server, and whereby, it is possible to prevent unauthorized access.

A control program to be executed by a processor of a communication terminal connected to a router, when a send request is issued, for performing a transmission process in accordance with the request and temporarily opening a receive port, and comprises: a first issuing step for issuing to the router a send request to request the router to send an ask signal for asking a repetitive response to an external server; a receiving step for receiving a response signal from the external server through the receive port in response to the send request issued by the first issuing step; and a determining step for determining an issuance cycle of the send request on the basis of the reception result by the receiving step.

A control program to be executed by a processor of a communication terminal connected to a router, when a send request is issued, for performing a transmission process in accordance with the request and temporarily opening a receive port, and comprises: a first issuing step for repeatedly issuing to the router a send request to request the router to send an ask signal for asking a response at timings different from each other to an external server; a receiving step for receiving a response signal from the external server through the receive port in response to the send request issued by the first issuing step; and a determining step for determining an issuance cycle of the send request on the basis of the reception result by the receiving step.

According to the present invention, a send request is repeatedly issued to the router at a cycle suitable for the router, that is, the longest cycle within the period during which the router opens the receive port when a send request is issued (port opening period), and therefore, it is possible to make a state in which the receive port is continuously opened while minimizing a load on communications line.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 (A) is a sequence diagram showing a part of a communication process performed in a case that a router is compliant with UPnP;

FIG. 2 (B) is an illustrative view showing a configuration of a port notification packet utilized in a case that the router is compliant with UPnP, FIG. 2 (C) is a sequence diagram showing another part of the communication process performed in a case that the router is compliant with UPnP;

FIG. 3 (A) is a sequence diagram showing a part of a communication process performed in a case that the router is not compliant with UPnP;

FIG. 3 (B) is a sequence diagram showing another part of the communication process in a case that the router is not compliant with UPnP;

FIG. 3 (C) is an illustrative view showing a configuration of a port notification packet utilized in a case that the router is not compliant with UPnP;

BEST MODE FOR PRACTICING THE INVENTION

Figure 1:
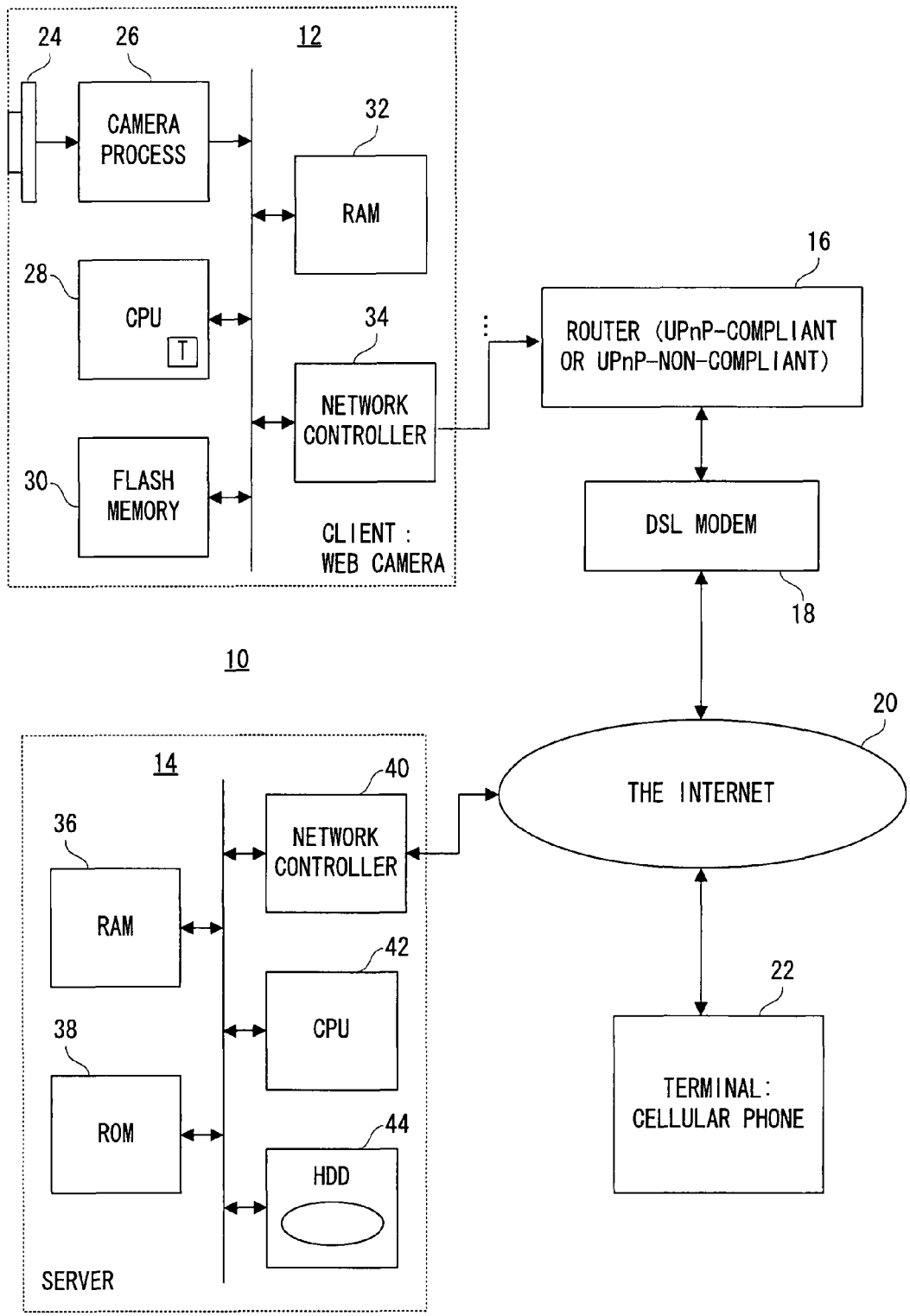
FIG. 1 is a block diagram showing a configuration in accordance with one embodiment of the present invention.

Referring to FIG. 1, a surveillance camera system 10 in the present embodiment includes a Web camera 12. The Web camera 12 is connected to the Internet 20 over a router 16 and a DSL modem 18. The Internet 20 is connected with a server 14, and through the server 14, the Web camera 12 accepts an operation from a terminal, such as a cellular phone 22 connected to the Internet 20. The detailed operation includes an operation of adjusting a sensitivity, a zoom magnification, etc. through an imager 24 and a camera processing circuit 26, and controlling a direction of the Web camera 12 via a drive unit not shown.

It should be noted that the router 16 is connected with other home information appliances such as a PC as needed as well as the Web camera 12. The Web camera 12, other home information appliances such as the PC, etc. are thus connected via the router 16 to thereby constitute one LAN. The router 16 has an only one global IP address, and each of the appliances constituting a LAN is assigned a private IP address. Then, when an appliance on the side of the LAN is communicated with an appliance on the side of the Internet 20, address/port converting processing is executed for converting a private IP address and a source port number utilized on the side of the LAN and a global IP address and a response wait port number utilized on the side of the Internet are transformed between them.

As a router 16, two kinds of protocols, a UPnP (Universal Plug & Play) protocol-compliant type and a UPnP non-compliant type are used. The Web camera 12 selects a control system suitable for the router 16 connected thereto by cooperating with the server 14, and accepts an operation from a cellular phone 22 according to the selected control system. Additionally, whether or not the router 16 is the UPnP-compliant type can be determined by means of a discovery function adopted by the UPnP, such as the SSDP (Simple Service Discovery Protocol).

An initial setting including selection of a control system is specifically executed as follows. That is, when the power source is turned on, the Web camera 12 first sends an M-SEARCH packet based on the SSDP to the router 16 in order to determine whether or not the router 16 is the UPnP-compliant type. FIG. 2 (A) shows a procedure of an initial setting in a case that the router 16 is the UPnP-compliant type, and FIG. 3 (A) shows a procedure of an initial setting in a case that the router 16 is the UPnP-non-compliant type.

First, with reference to FIG. 2 (A), in a case that the router 16 is the UPnP-compliant type, the router 16 sends back a 200 OK packet to the Web camera 12 in response to a M-SEARCH packet from the Web camera 12 (client). The Web camera 12 having receiving the 200 OK packet next requests a global IP address from the router 16. The router 16 notifies the Web camera 12 of the global IP address in response to the request from the Web camera 12.

The Web camera 12 thus having obtaining the global IP address then requests the router 16 to open a specific port. The router 16 opens the specific port in response to the request from the Web camera 12. Thereafter, all the packets directed to the specific port are transmitted to the Web camera 12 by the router 16.

Succeedingly, the Web camera 12 sends a port notification packet complying with the UDP (User Datagram Protocol) to the server 14. A configuration of the port notification packet sent to the router 16 by the Web camera 12 (client) when the router 16 is the UPnP-compliant type is shown in FIG. 2 (B). With reference to FIG. 2 (B), in the data area of the port notification packet, a port number of the specific port opened by the router 16 is described. In addition, in the data area, an appliance ID for identification, etc. is described as necessary.

In the header area, a private IP address and a source port number are described like other packets. The private IP address and the source port number within the header area are converted into a global IP address and a response wait port number when passing through the router 16.

The server 14 receives the port notification packet from the Web camera 12, extracts the specific port number from the data area of the received port notification packet, and the global IP address from the header area of the same port notification packet. Then, a response packet is sent to the destination specified by the extracted address and the extracted port number, and the extracted address and the extracted port number are held in the RAM 36. The sent response packet is transmitted to the Web camera 12 by the router 16. The address and the port number held in the RAM 36 are referred when a command is sent to the Web camera 12 thereafter. It should be noted that the data in the RAM 36 such as an address, a port number, a command, and the like are backed up in the HDD 44 (and so forth).

Next, with reference to FIG. 3 (A), in a case that the router 16 is the UPnP-non-compliant type, the router 16 does not respond even if an M-SEARCH packet is sent from the Web camera 12. The Web camera 12 does not receive a 200 OK packet even after the M-SEARCH packet is sent, and thus determines that the router 16 is the UPnP-non-compliant type to shift the process to a processing for evaluating an optimum send interval (T).

In the optimum send interval calculating processing, the client, that is, the Web camera 12 first sends a test start packet complying with the UDP to the server 14.

The transmitted test start packet is subjected to the address/port converting processing by the router 16, and the packet being subjected to the address/port converting processing is received by the server 14. At this time, in the router 16, a response wait port is opened, and a source address, that is, the private IP address of the Web camera 12, and the port numbers before and after the conversion, that is, the source port number and the response wait port number are recorded in the table. The response wait port opened in response to the test start packet is closed after a lapse of 15 seconds.

The server 14 sends a response packet to the client after a lapse of a predetermined time such as 2 seconds after receiving the test start packet. In the response packet, time information indicative of the elapsed time from reception of the test start packet, that is, "2 seconds" is described.

The response packet sent after 2 seconds is subjected to address/port converting processing on the basis of the above-described table in the router 16, and the packet on which the address/port converting processing is performed is received by the Web camera 12. The Web camera 12 extracts the time information of "2 seconds" from the received response packet, and records the extracted time information of "2 seconds" in the register "T".

The server 14 further successively sends response packets to the client after an elapse of 4 seconds, 6 seconds . . . from the reception of the test start packet. In each of the response packet, the elapsed time period "4 seconds", "6 seconds" . . . is described.

The response packets sent after 4 seconds, 6 seconds . . . are also subjected to address/port converting processing in the router 16, and the packets on which the converting processing is performed are received by the Web camera 12. The Web camera 12 extracts the time information "4 seconds", "6 seconds" . . . from the received response packet, and records the extracted time information "4 seconds", "6 seconds" . . . in the register "T" so as to overwrite the previous value. Accordingly, the time information extracted from the response packet received directly after is held in the register "T".

Then, assuming that a response packet sent after t seconds is received by the Web camera 12, and the response wait port shall be closed directly thereafter. All the successive response packets, that is, response packets transmitted after (t+2) seconds, (t+4) seconds . . . are discarded in the routers 16, and do not arrive at the Web camera 12.

The Web camera 12 sends a test end packet because it does not receive a next response packet even after an elapse of 5 seconds from the preceding reception. The server 14 receives the test end packet to end the sending of the response packet. Consequently, in the register "T" of the Web camera 12, "t seconds" remains, and accordingly, "t seconds" is an optimum send interval T.

After completion of such an initial setting, the Web camera 12 accepts a command from the terminal, that is, the cellular phone 22 through the server 14, and sends back an execution result of the command to the cellular phone 22. A transmission procedure of a command and an execution result in a case that the router 16 is the UPnP-compliant type is shown in FIG. 2 (C), and a transmission procedure of a command and an execution result in a case that the router 16 is the UPnP-non-compliant type is shown in FIG. 3 (B).

First, with reference to FIG. 2 (C), as to the router 16 of the UPnP-compliant type, the specific port is opened by the preceding initial setting. A command sent from the cellular phone 22 is received by the server 14. The server 14 holds the received command in the RAM 36 while sending a "command's presence" notification packet to the destination specified by the address and the port number held in the RAM 36.

The "command's presence" notification packet sent from the server 14 is received by the router 16. The router 16 transmits the received "command's presence" notification packet to the Web camera 12.

The Web camera 12 receives the "command's presence" notification packet transmitted by the router 16, and sends a command request packet complying with the TCP (Transmission Control Protocol). The sent command request packet is received by the server 14, and in response thereto, the server 14 sends a command held in the RAM 36 to the client. The sent command is received in a predetermined port by the router 16, and the router 16 transmits the received command to the Web camera 12.

The Web camera 12 receives the command transferred by the router 16, executes the received command, and sends an execution result according to the TCP. The transmitted execution result is received by the server 14, and the server 14 transmits the received execution result to the cellular phone 22. The transmitted execution result is received by the cellular phone 22, and the cellular phone 22 displays the received execution result on an LCD monitor (not illustrated).

Next, with reference to FIG. 3 (B), because the router 16 is the UPnP-non-compliant type, the client, that is, the Web camera 12 periodically sends a port notification packet at the optimum send interval (T) calculated in the initial setting. Consequently, in the router 16, the response wait port is in a continuously opened state.

A configuration of a port notification packet sent to the router 16 by the Web camera 12 (client) when the router 16 is the UPnP-non-compliant type is shown in FIG. 3 (C). With reference to FIG. 3 (C), an insignificant port number, "0", is described in the data area of the port notification packet, and the private IP address and the source port number are described in the header area thereof. The private IP address and the source port number in the header area are converted into the global IP address and the response wait port number when traveling across the router 16.

The server 14 receives the port notification packet from the Web camera 12, and extracts the global IP address and the response wait port number from the header area of the received port notification packet. Then, the extracted address and port number are held in the RAM 36.

The command sent from the cellular phone 22 is received by the server 14. The server 14 holds the received command in the RAM 36 while sending a "command's presence" notification packet complying with the UDP to a destination specified by the address and the port number held in the RAM 36. The "command's presence" notification packet sent from the server 14 is received in the response wait port by the router 16, and the router 16 transfers the received "command's presence" notification packet to the Web camera 12.

The Web camera 12 receives the "command's presence" notification packet transmitted by the router 16, and sends a command request packet complying with the TCP. The sent command request packet is received at a predetermined port by the server 14. The server 14 sends the command held in the RAM 36 in accordance with the TCP to the client. The sent command is received by the router 16 at a predetermined port, and the router 16 transmits the received command to the Web camera 12.

The Web camera 12 receives the command transmitted by the router 16, executes the received command, and sends an execution result in accordance with the TCP. The sent execution result is received by the server 14, and the server 14 transmits the received execution result to the cellular phone 22. The transmitted execution result is received by the cellular phone 22, and the cellular phone 22 displays the received execution result on the LCD monitor.

Figure 4:
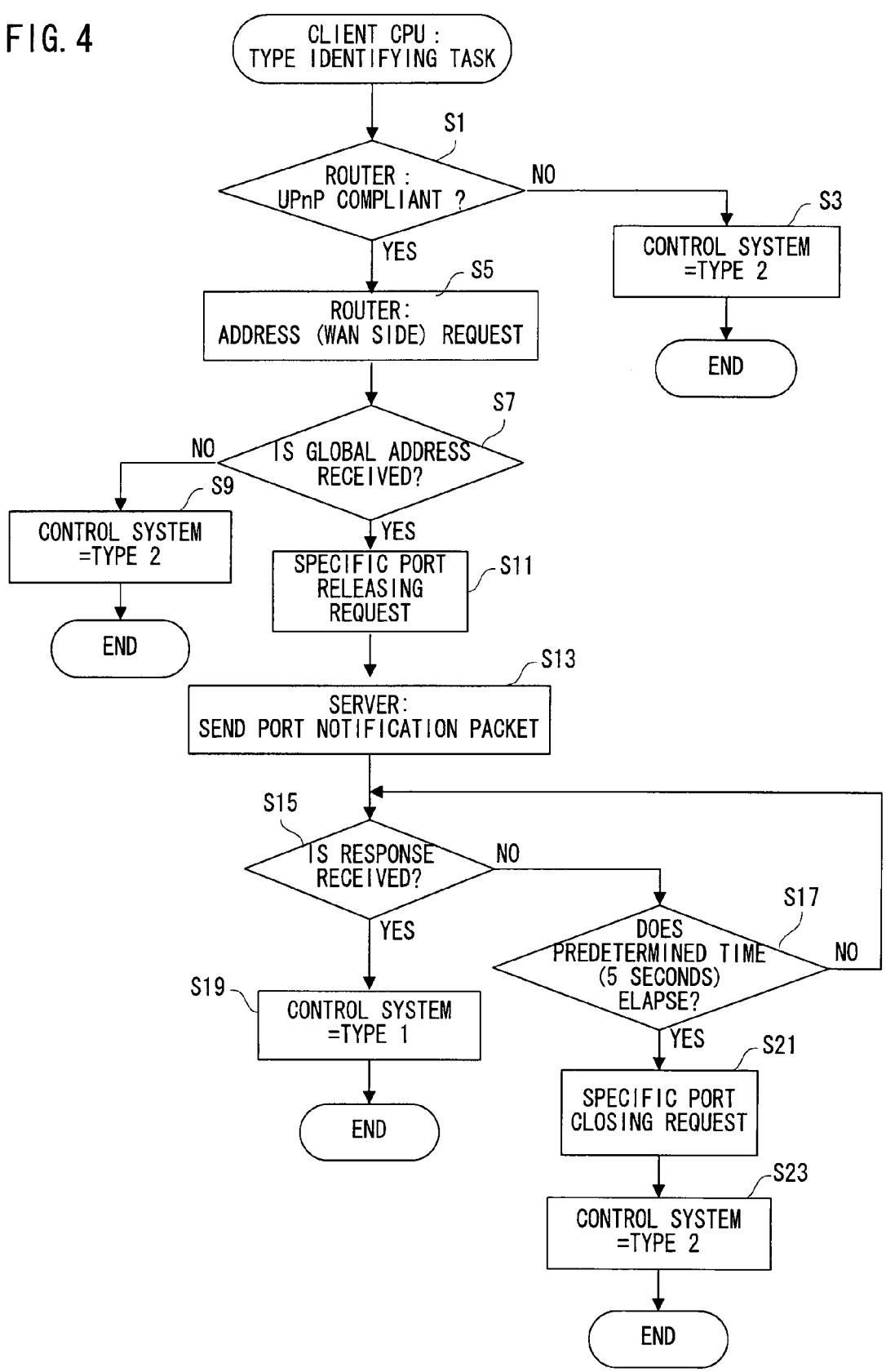
FIG. 4 is a flowchart showing a part of an operation of a client CPU.

The client, that is, the CPU 28 of the Web camera 12 executes a type identifying task shown in FIG. 4 when the power source, or the like is turned on. After completion of the type identifying task, a main task shown in FIG. 5 and FIG. 6, a port notification packet sending task shown in FIG. 7, and a command executing task shown in FIG. 8 are executed in parallel manner under the control of the multitasking OS such as μITRON. It should be noted that the control programs according to these flowcharts are stored in the flash memory 30.

With reference to FIG. 4, in the type identifying task, it is determined whether or not the router 16 is the UPnP-compliant type in a step S1. If the determination result is negative, the process shifts to a step S3. In the step S3, a control system is set to the "type 2". Thereafter, the task is ended.

Here, the determination in the step S1 can be performed as follows. An M-SEARCH packet on the basis of the SSDP is sent to the router 16, and responding to a 200 OK packet being sent back from the router 16, it is determined to be the UPnP-compliant type. On the other hand, if a 200 OK packet is not sent back, it is determined to be the UPnP-non-compliant type.

If the determination result in the step S1 is affirmative, the process shifts to a step S5 to request an IP address (WAN address) to access the Internet 20 via the network controller 34 from the router 16. In a step S7, it is determined whether or not a global IP address is received. If the determination result is negative, that is, if a private IP address is received, the control system is set to "type 2" in a step S9. Thereafter, the main task is ended.

When a global IP address is received, the process shifts from the step S7 to a step S11 to request the router 16 to open a specific port. In a next step S13, a port notification packet compliant with the UDP is sent to the server 14. In the data area of the port notification packet, a port number of a specific port requested to be opened to the router 16 is described (see FIG. 2 (B)). Thereafter, the process enters a loop in steps S15 and S17.

In the step S15, it is determined whether or not a response packet is received, and in the step S17, it is determined whether or not a predetermined time, 5 seconds, for example, has elapsed. If a response packet is received within 5 seconds from sending of the port notification packet, "YES" is determined in the step S15, and the process proceeds to a step 19. In the step S19, the control system is set to the "type 1". Then, the task is ended.

If a response packet is not received even after an elapse of 5 seconds, "YES" is determined in the step S17, and then, the process proceeds to a step S21. In the step S21, the router 16 is requested to close the specific port previously opened. In a step S23, the control system is set to the "type 2". Then, the task is ended.

If the router 16 is not complaint with the UPnP, the type 2 is immediately selected as a control system. On the other hand, if the router 16 is compliant with the UPnP, only when a global IP address can be obtained from the router 16, and a response packet can be received within a predetermined time after sending of the port notification packet, the "type 1" is selected as a control system. If a global IP address cannot be obtained from the router 16, the "type 2" is selected as a control system. Additionally, even if a global IP address can be obtained, when a response packet cannot be received within a predetermined time, it is determined that the external server 14 does not send back a response packet to the notified address and port number, or it is determined that the specific port is not opened in the router 16, and therefore, the control system becomes the "type 2".

Figure 5:
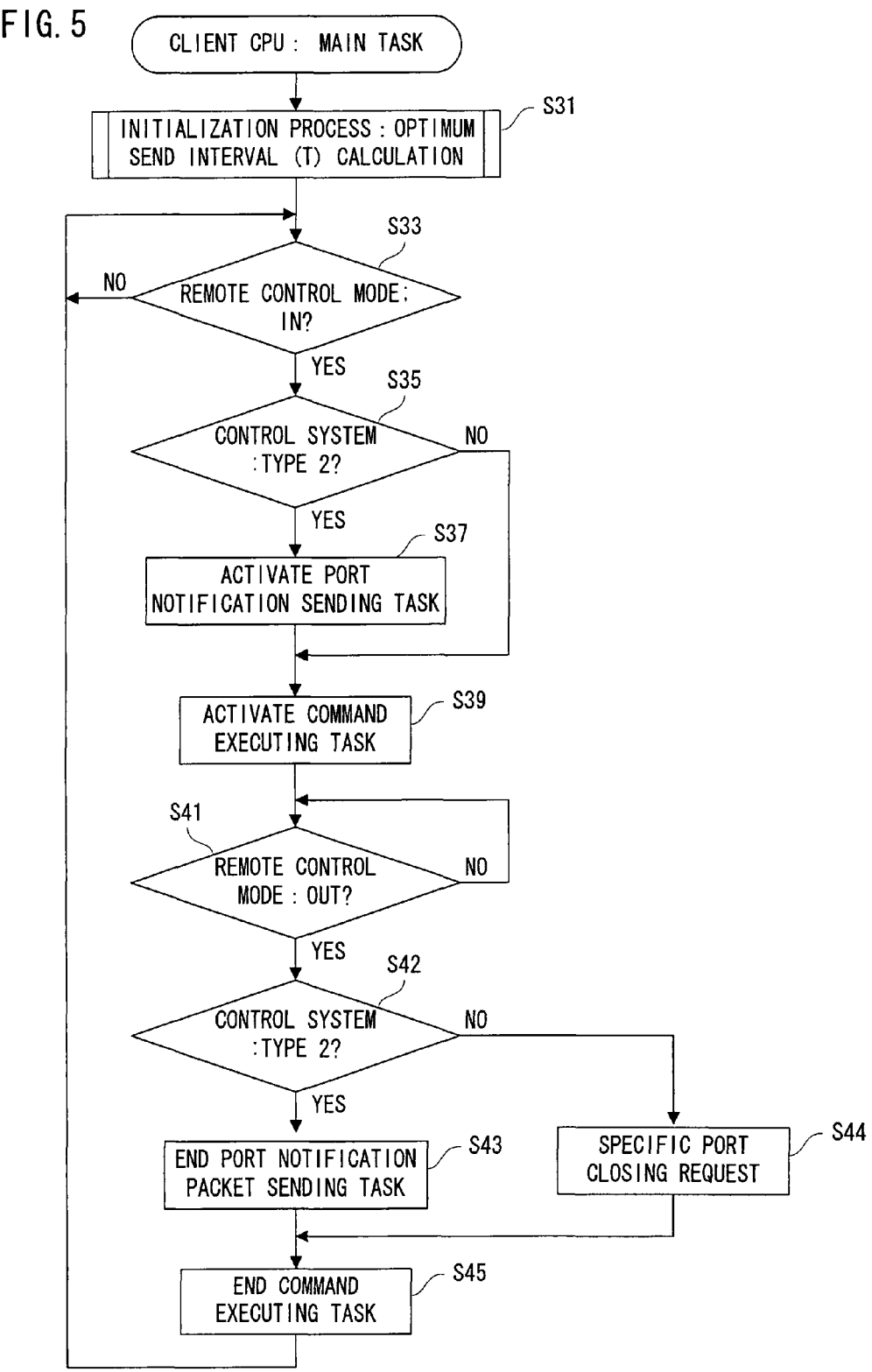
FIG. 5 is a flowchart showing another part of the operation of the client CPU.

With reference to FIG. 5, in the main task, initialization processing is first executed in a step S31. In the initialization processing, an optimum send interval (T) at a time of sending a port notification packet is calculated. It should be noted that a detail of the optimum send interval (T) calculating processing is described later.

In a next step S33, it is determined whether or not the process enters a remote control mode. If the process enters the remote control mode, the process shifts from the step S33 to a step S35 to determine whether or not the control system is set to the "type 2". If the determination result is affirmative, a port notification packet sending task (as later described) is activated in a step S37, and then, the process shifts to a step 39. If the determination result in the step S35 is negative, that is, if the control system is set to the "type 1", the process directly shifts to the step S39.

In the step S39, a command executing task (as later described) is activated. In a next step S41, it is determined whether or not the process is out of the remote control mode. More specifically, when a TCP connection between the terminal 22 and the Web camera 12 is disconnected, it is determined that the process is out of the remote control mode. When the process is out of the remote control mode, it is determined whether or not the control system is set to the "type 2" in a step S42. If the determination result is affirmative, the port notification packet sending task is ended in a step S43, and then, the process shifts to a step S45. As the port notification packet sending task is ended, a continuous opened state of the response wait port is canceled. Thus, by closing the response wait port after completion of the remote control, it is possible to prevent unauthorized access.

If the determination result in the step S42 is negative, that is, if the control system is the "type 1", the router 16 is requested to close the specific port in a step S44, and thereafter, the process proceeds to the step S45. Thus, by closing the specific port after completion of the remote control, it is possible to prevent unauthorized access.

In the step S45, the command executing task is ended. Then, the process returns to the step S33.

Figure 6:
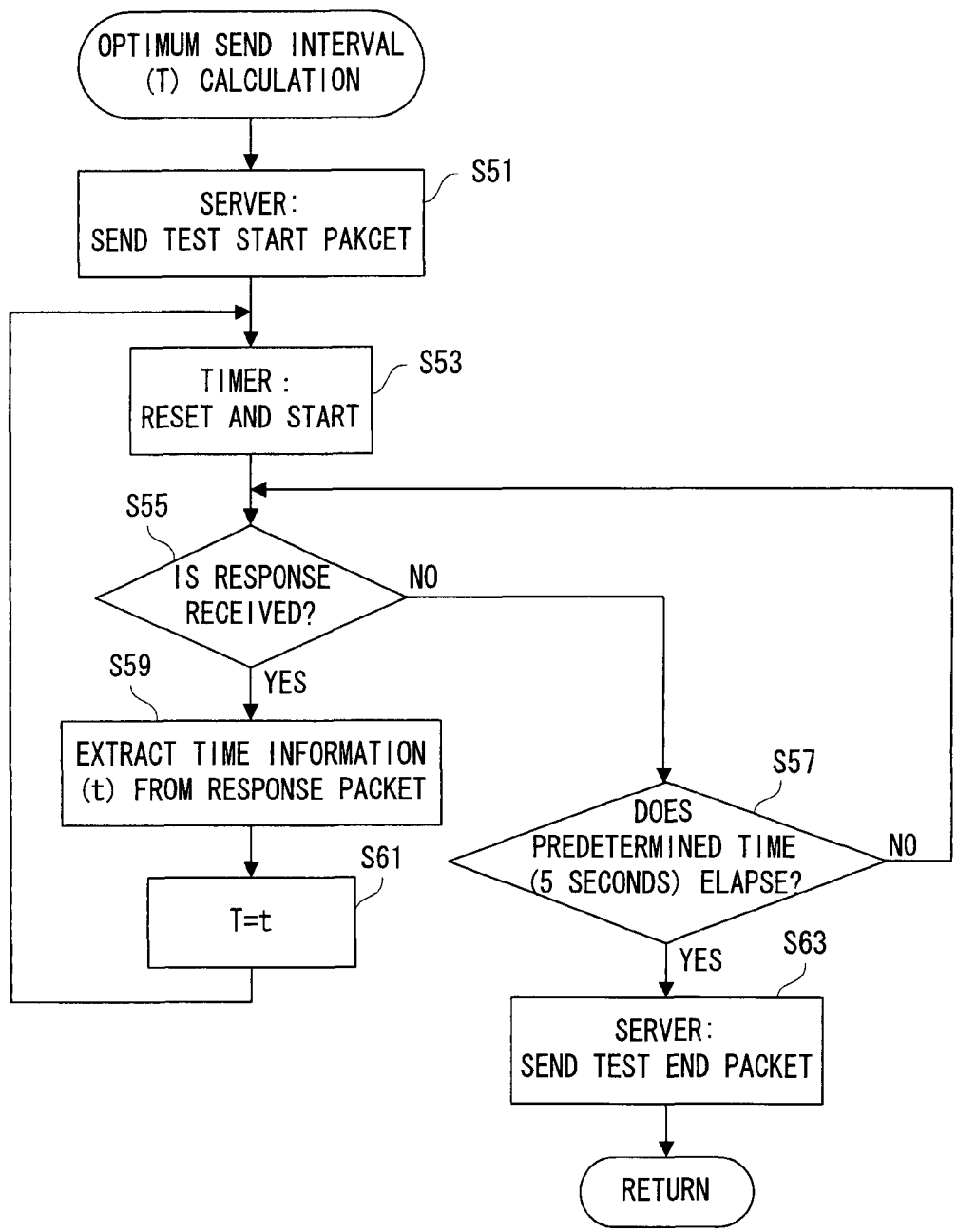
FIG. 6 is a flowchart showing the other part of the operation of the client CPU.

The above-described optimum send interval (T) calculating processing in the step S31 is executed according to a subroutine shown in FIG. 6. With reference to FIG. 6, in a step S51, a test start packet compliant with the UDP is sent to the server 14. In a step S53, a timer is reset and started, and then, the process enters a loop in steps S55 and S57. In the step S55, it is determined whether or not a response packet is received, and in the step S57, it is determined whether or not a predetermined time, 5 seconds, for example, has elapsed.

If a response packet is received within 5 seconds, "YES" is determined in the step S55, and the process shifts to a step S59. In the step S59, time information (t) is extracted from the received response packet, and in a step S61, the extracted time information (t) is set to the register "T". Then, the process returns to the step S53.

If a response packet is not received even after a lapse of 5 seconds, "YES" is determined in the step S57, and the process shifts to a step S63. In the step S63, a test end packet compliant with the UDP is sent to the server 14, and then, the process is restored to the hierarchical upper level of the routine.

Figure 7:
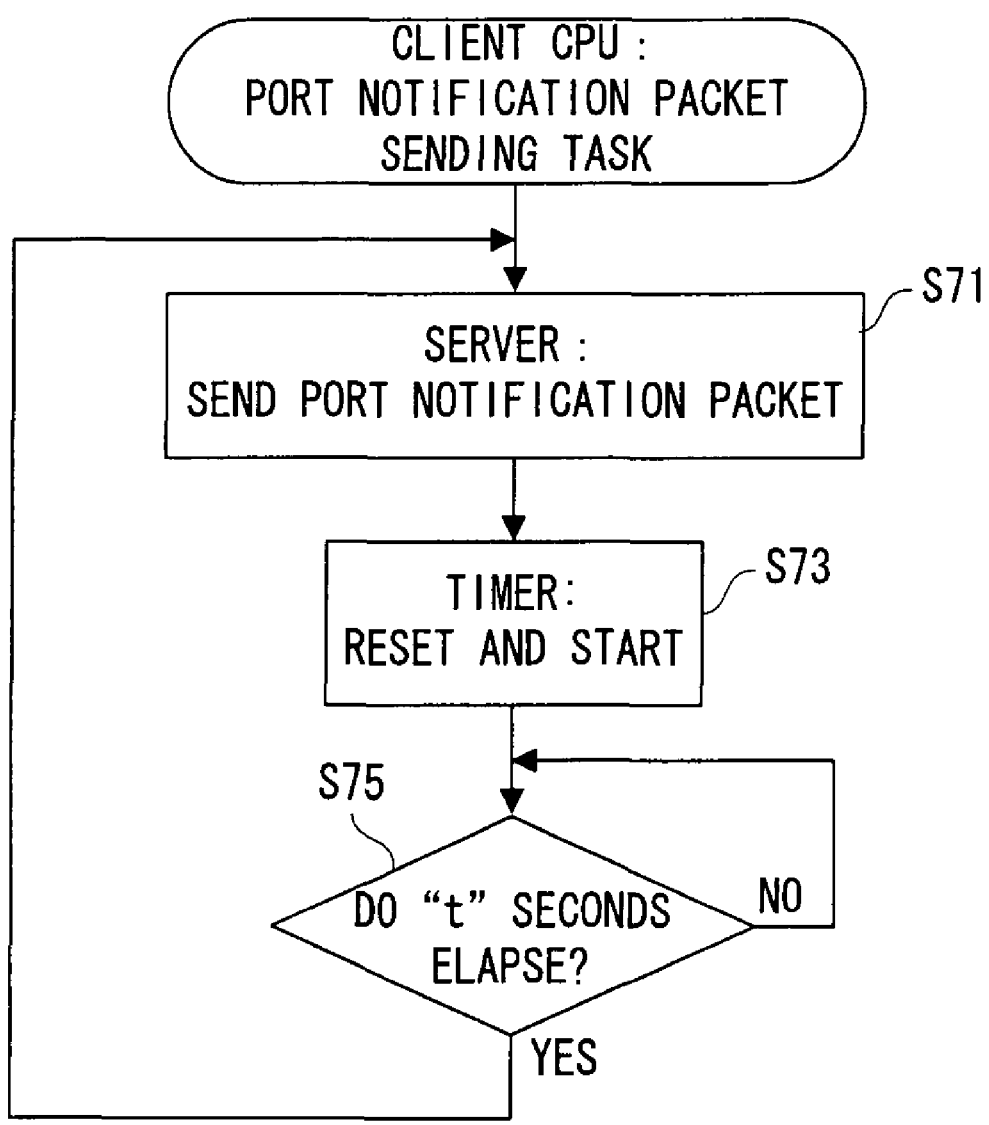
FIG. 7 is a flowchart showing a further part of the operation of the client CPU.
Figure 8:
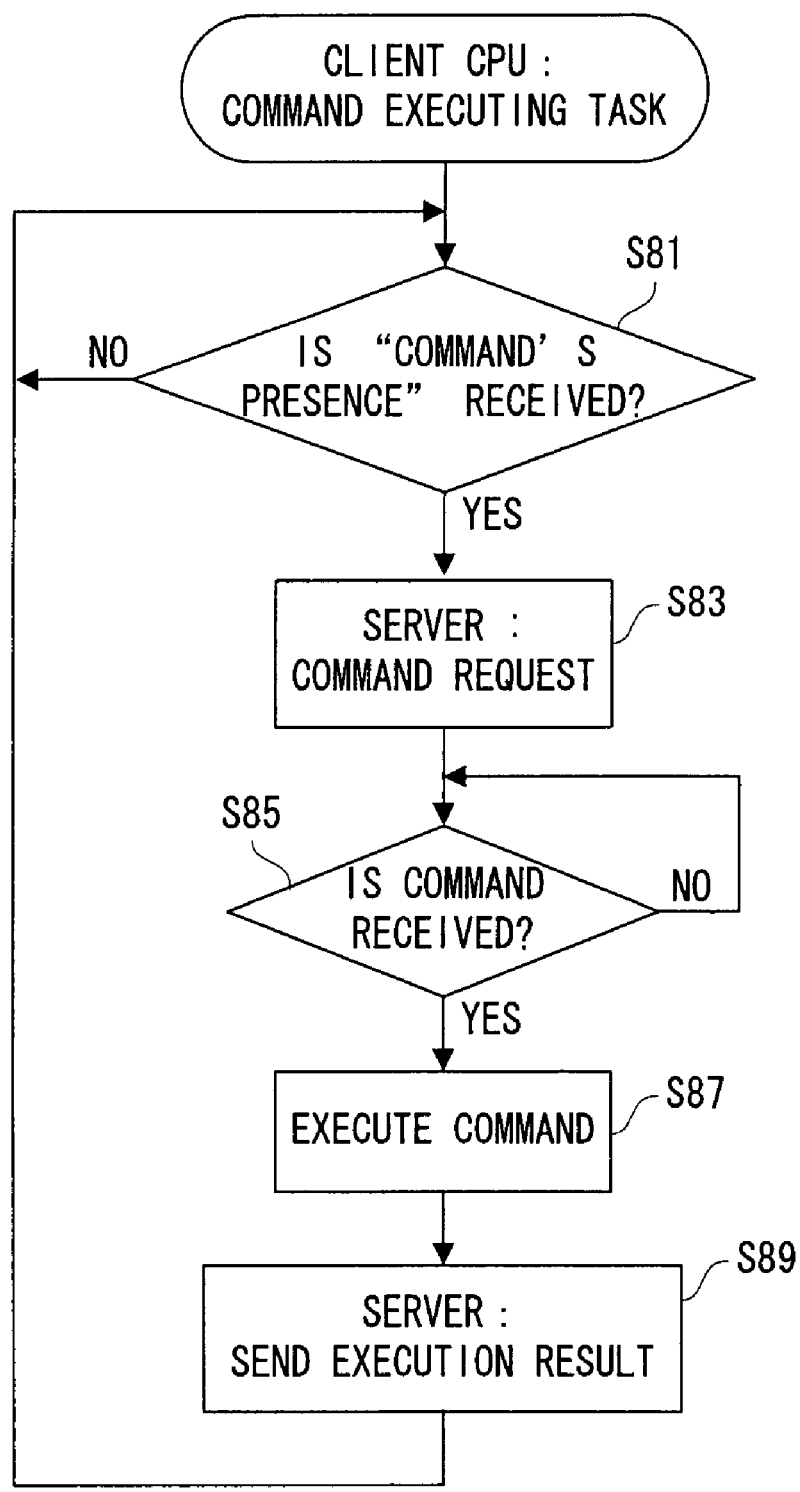
FIG. 8 is a flowchart showing another part of the operation of the client CPU.

With reference to FIG. 7, in the port notification packet sending task, in a first step S71, a port notification packet (see FIG. 3 (C)) is sent to the server 14, and in a step S73, the timer is reset and started. In a step S75, it is determined whether or not the optimum send interval (T) has elapsed, and if the determination result is affirmative, the process returns to the step S71.

With reference to FIG. 8, in the command executing task, in a first step S81, it is determined whether or not a "command's presence" notification packet is received. In a step S83, a command request packet compliant with the TCP is sent to the server 14. In a step S85, it is determined whether or not a command is received, and if a command is received, the process shifts to a step S87. In the step S87, the received command is executed, and in a step S89, the execution result is sent to the server 14 according to the TCP. Then, the process returns to the step S81.

Figure 9:
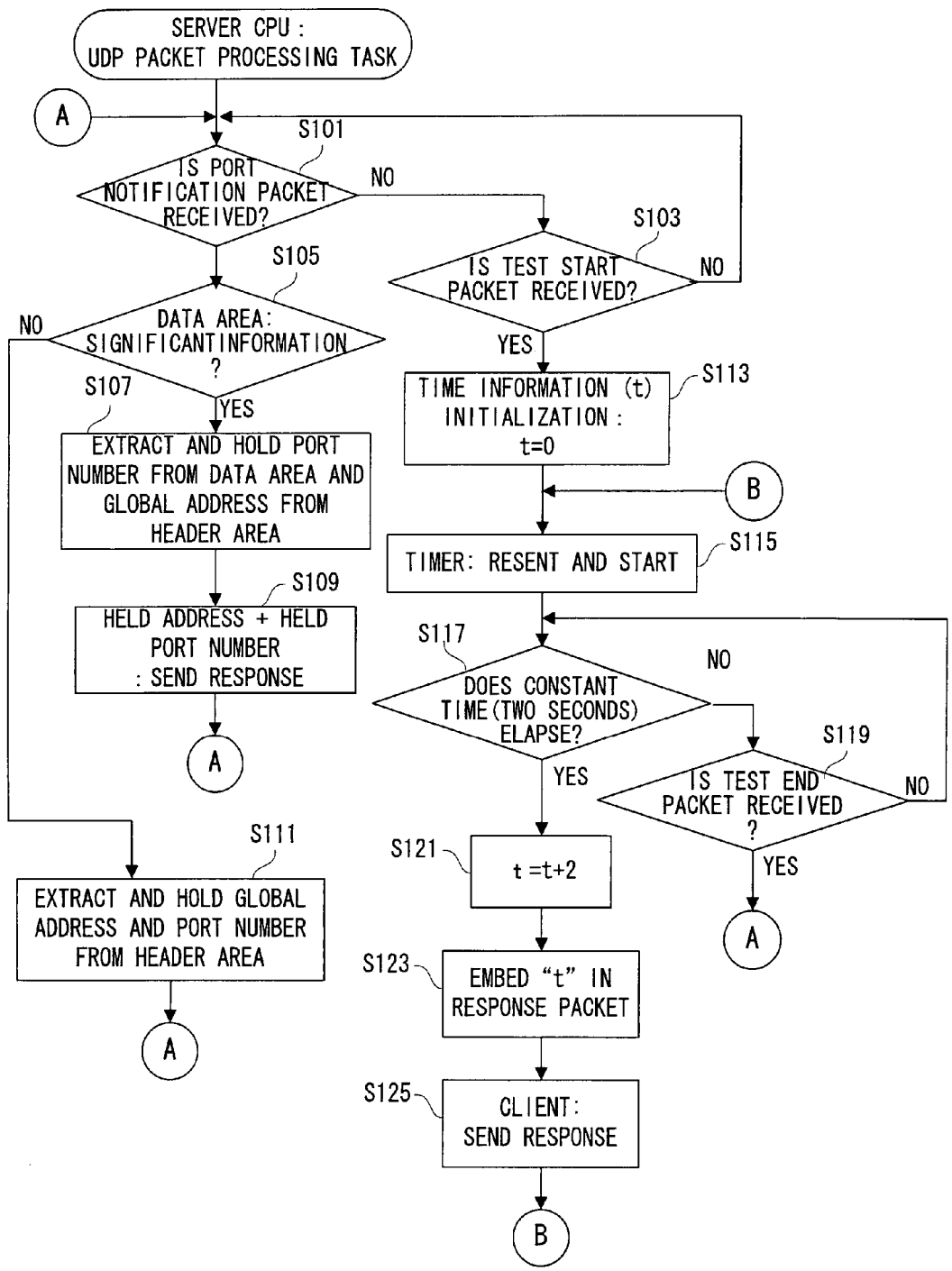
FIG. 9 is a flowchart showing a part of an operation of a server CPU.
Figure 10:
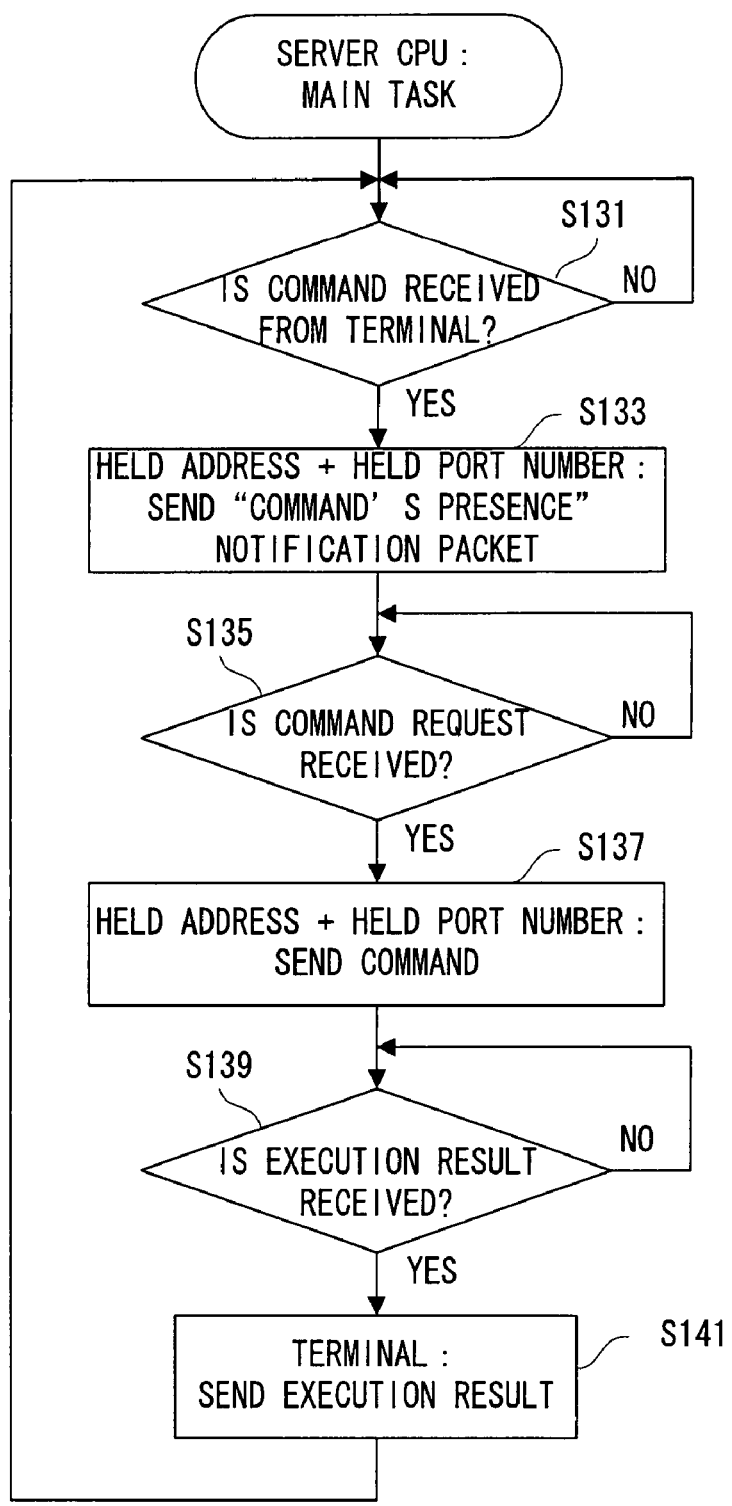
FIG. 10 is a flowchart showing another part of the operation of the server CPU.

The CPU42 of the server 14 executes a UDP packet processing task shown in FIG. 9 and a main task shown in FIG. 10 in a parallel manner under the control of the multitasking OS such as μITRON. Additionally, the control program corresponding to these flowcharts are stored in the ROM 38.

With reference to FIG. 9, in the UDP packet processing task, the process enters a loop in first steps S101 and S103. In the step S101, it is determined whether or not a port notification packet is received, and in the step S103, it is determined whether or not a test start packet is received. When the port notification packet is received, "YES" is determined in the step S101, and the process shifts to a step S105. In the step S105, it is determined whether or not significant information is described in the data area of the received port notification packet. If the determination result in the step S105 is affirmative, the process shifts to a step S107. For example, when the port notification packet shown in FIG. 2 (B) is received, the determination result in the step S105 becomes affirmative.

In the step S107, a port number is extracted from the data area of the received port notification packet, and an address is extracted from the header area of the same port notification packet. Then, the extracted port number, that is, the number of the specific port, and the extracted address, that is, the global IP address are held in the RAM 36. In a next step S109, a response packet is sent to the destination specified by the address and the port number held in the RAM 36, and then, the process returns to a loop of the steps S101 and S103.

If the determination result is negative in the step S105, the process shifts to a step S111. When the port notification packet shown in FIG. 3 (C) is received, the determination result in the step S105 becomes negative. In the step S111, an address and a port number are extracted from the header area of the received port notification packet. Then, the extracted port number, that is, the response wait port number and the extracted address, that is, the global IP address are held in the RAM 36. Then, the process returns to the loop in the steps S101 and S103.

When a test start packet is received, "YES" is determined in the step S103, and the process shifts to a step S113. In the step S113, time information (t) is initialized. More specifically, "0" is se to the variable t. Then, in a step S115, the timer is reset and started, and the process enters a loop in steps S117 and S119. In the step S117, it is determined whether or not a constant time, two seconds, for example, has elapsed from receiving of the test start packet (preceding test packet) by the timer, and in the step S119, it is determined whether or not a test end packet is received.

After an elapse of 2 seconds from receiving of the test start packet (preceding test packet), in a first step S121, "2" is added to the variable t, and in a next step S123, the value of the variable t is embedded in a response packet, and in a step S125, the response packet is sent to the client according to the UDP. Then, the process returns to the step S115.

When the test end packet is received, the process returns to the loop in the steps S101 and S103.

With reference to FIG. 10, in the main task, in a first step S131, it is determined whether or not a command is received from a terminal, that is, the cellular phone 22. When the command is received, the process shifts to a step S133 to send a "command's presence" notification packet compliant with the UDP to the destination specified by the address and the port number held in the RAM 36. Here, the port number held in the RAM 36 is either of the specific port number and the response wait port number.

In a step S135, it is determined whether or not a command request packet is received, and when a command request packet is received, the process shifts to a step S137 to send the command previously received and held in the RAM 36 to the destination specified by the address and the port number held in the same RAM 36. In a next step S139, it is determined whether or not an execution result is received, and when the execution result is received, the process shifts to a step S141 to transmit the received execution result to the cellular phone 22. Then, the process returns to the step S131.

As understood from the above description, in this embodiment, either of the UPnP protocol compliant type and the UPnP protocol-non compliant type is utilized as a router 16. A command is transmitted from the external server 14 through the router 16.

When the router 16 is the UPnP-compliant type, the Web camera 12 issues to the router 16 a port opening request. This opens a specific port. Next, the Web camera 12 request the router 16 to send destination information including an identifier of the opened specific port to the external server 14. The destination information (see FIG. 2 (B)) is sent to the external server 14 by the router 16. The external server 14 sends a command to the specific port on the basis of the identifier included in the destination information.

When the router 16 is the UPnP-non-compliant type, the Web camera 12 repeatedly issues information send requests to the router 16. The information send request to be issued is a send request for sending the destination information including an identifier of an arbitrary port to the external server 14. The router 16 sends destination information (see FIG. 3 (C)) to the external server 14, and temporarily opens an arbitrary port (response wait port) every time that an information send request is issued. The external server 14 outputs a command on the basis of the identifier included in the destination information to a response wait port.

Thus, when the router 16 is the UPnP-compliant type, the Web camera 12 request the router 16 to open a specific port, and to send the destination information including the identifier of the opened specific port to the server 14. On the other hand, when the router 16 is the UPnP-non-compliant type, an information send request is repeatedly issued to the router 16 to thereby make a state in which the response wait port is continuously opened, and notifies the server 14 of the destination information including the identifier of the opened response wait port. Thus, it is possible to accept a command from the server 14 at an arbitrary timing regardless of types of the router 16.

In addition, when the router 16 is the UPnP-non-compliant type, the Web camera 12 issues to the router 16 a send request to request the router 16 to send a test packet for requesting repetitive responses to the server 14. In response thereto, the router 16 sends a test packet to the server 14, and temporarily opens the response wait port. The server 14 repeatedly sends back a response packet in response to the test packet. At this time, the server 14 attaches time information representative of a waiting time from receiving the test packet to its reply to the response packet to be sent back.

The Web camera 12 receives the response packet repeatedly sent back from the external server 14 through the opened response wait port. When the response wait port is closed, it becomes impossible to receive a response packet. Here, a time indicated by the time information attached to the lastly received response packet shall be a send request issuing cycle (=optimum send cycle T).

The Web camera 12 repeatedly issues a send request to the router 16 at the cycle thus determined, the longest period within the period (port opening period) during which the router 16 opens the response wait port in response to a send request, that is, the period equal to or slightly shorter than the port opening period. Thus, it is possible to making a state in which the response wait port is continuously opened while reducing the load on the communications line, such as the Internet 20, a LAN, etc.

In this embodiment, the server 14 attaches the time information to the response packet, and the Web camera 12 regards the time indicated by the time information attached to the lastly received response packet as an information sending request issuing cycle. However, it may be possible that the Web camera 12 itself counts the elapsed time from sending a test packet to receiving a response packet, and regard the counting result corresponding to the finally received response packet as an information sending request issuing cycle.

Next, another embodiment is described. The embodiment also relates to the surveillance camera system. The surveillance camera system of this embodiment is constituted as in the surveillance camera system of the above-described embodiment. The operation of the surveillance camera system in this embodiment is the same as that of the above-described embodiment except for an optimum send interval (T) calculating process. Thus, in this embodiment, by utilizing FIG. 1, FIG. 2 (A), FIG. 2 (B), FIG. 3 (B), FIG. 4, FIG. 5, FIG. 7, FIG. 8 and FIG. 10, a duplicated description will be omitted.

In what follows, the optimum send interval calculating processing is described with reference to FIG. 11-FIG. 13. It should be noted that FIG. 11 corresponds to FIG. 3 (A), FIG. 12 corresponds to FIG. 6, and FIG. 13 corresponds to FIG. 9.

Figure 11:
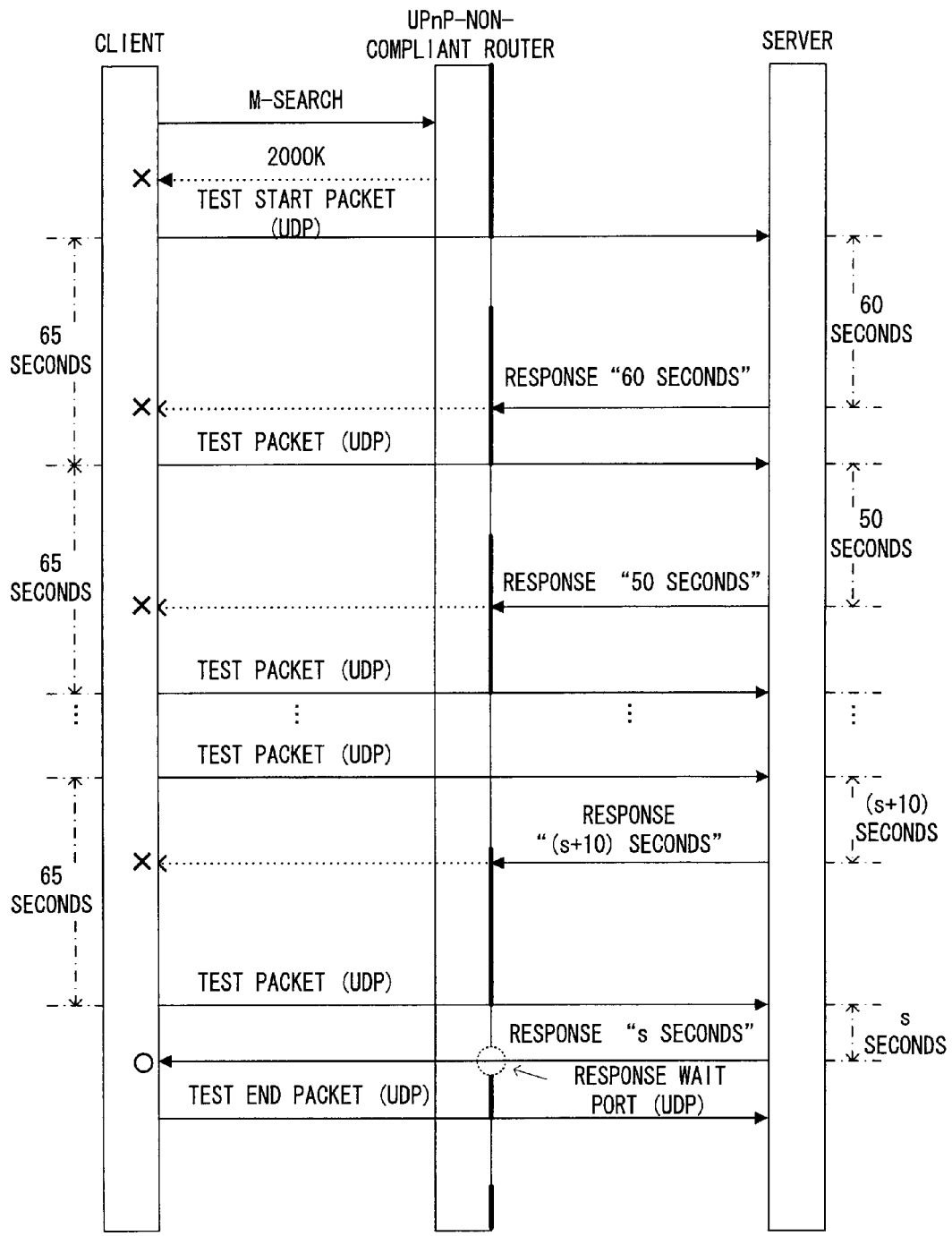
FIG. 11 is a sequence diagram showing a part of a communication process performed in a case that a router is not compliant with UPnP in another embodiment.

First, with reference to FIG. 11, in a case that the router 16 is the UPnP-non-compliant type, the router 16 does not respond to an M-SEARCH packet from the Web camera 12. Since a 200 OK packet is not sent back even if an M-SEARCH packet is sent, the Web camera 12 selects the type 2 as a control system to shift to the optimum send interval (T) calculating processing.

In the optimum send interval calculating processing, the client, that is, the Web camera 12 first sends a test start packet compliant with the UDP to the server 14. The sent test start packet is subjected to address/port converting processing by the router 16, and the packet on which the address/port converting processing is performed is received by the server 14. At this time, in the router 16, a response wait port is opened, and a source address, that is, a private IP address of the Web camera 12 and port numbers before and after the conversion, that is, a source port number and a response wait port number are recorded in the table. The response wait port opened in response to the test start packet is closed after a lapse of a predetermined time period, 15 seconds, for example.

The server 14 sends a response packet compliant with the UDP to the client after 60 seconds from receiving the test start packet. In the response packet, the time information indicative of the elapsed time from receiving the test start packet, that is, "60 seconds" is described.

At this time, the response wait port has already been closed, thus, the response packet sent after 60 seconds is discarded in the router 16, and the Web camera 12 cannot receive a response packet.

Thus, the Web camera 12 sends a first test packet to the server 14 when a predetermined time period, 65 seconds, for example has elapsed from sending of the test start packet. The sent test packet is subjected to address/port converting processing by the router 16, and the packet on which the address/port converting processing is performed is received by the server 14. At this time, in the router 16, the response wait port is opened again, and the private IP address, the source port number, and the response wait port number are recorded in the table. The response wait port opened in response to the test packet is closed after a lapse of 15 seconds, for example.

The server 14 sends a response packet to the client after 50 seconds from receiving the test packet. In the response packet, the time information indicative of the elapsed time from receiving of the test start packet, that is, "50 seconds" is described.

At this time, the response wait port has already been closed, and thus, the response packet sent after 50 seconds is discarded in the router 16, and the Web camera 12 cannot receive a response packet.

Thus, the Web camera 12 sends a next test packet to the server 14 when 65 seconds have elapsed from sending the preceding test packet. The sent test packet is subjected to the above described processing in the router 16, and then received by the server 14. The server 14 sends a response packet "40 seconds" to the client after 40 seconds have elapsed after receiving the test packet.

However, at this time also, the response wait port has already been closed, thus, the response packet "40 seconds" is discarded in the router 16, and the Web camera 12 cannot receive a response packet.

Thus, the Web camera 12 sends a further next test packet to the server 14 when 65 seconds have elapsed from sending the previous test packet. That is, the Web camera 12 sends a test packet for every 65 seconds while a response packet cannot be received.

In response to the test packet thus sent every 65 seconds, the server 14 sends a response packet "30 seconds", a response packet "20 seconds" . . . by shortening a waiting time until the response by 10 seconds at each time, that is, after 30 seconds, 20 seconds . . . from the reception.

Thus, when a waiting time until the response (this shall be s seconds) is below a port opening time period, the Web camera 12 can receive a response packet. The Web camera 12 extracts time information "s seconds" from the received response packet, and records the extracted time information "s seconds" in the register "T". For example, in a case that the opening time of the response wait port is 15 seconds, a response packet "10 seconds" arrives at the Web camera 12, and "10 seconds" is recorded in the register "T".

When the time information "s seconds" is thus recorded in the register "T", the Web camera 12 sends a test end packet, and in the server 14 receiving the test end packet, the optimum send interval calculating processing is ended.

Figure 12:
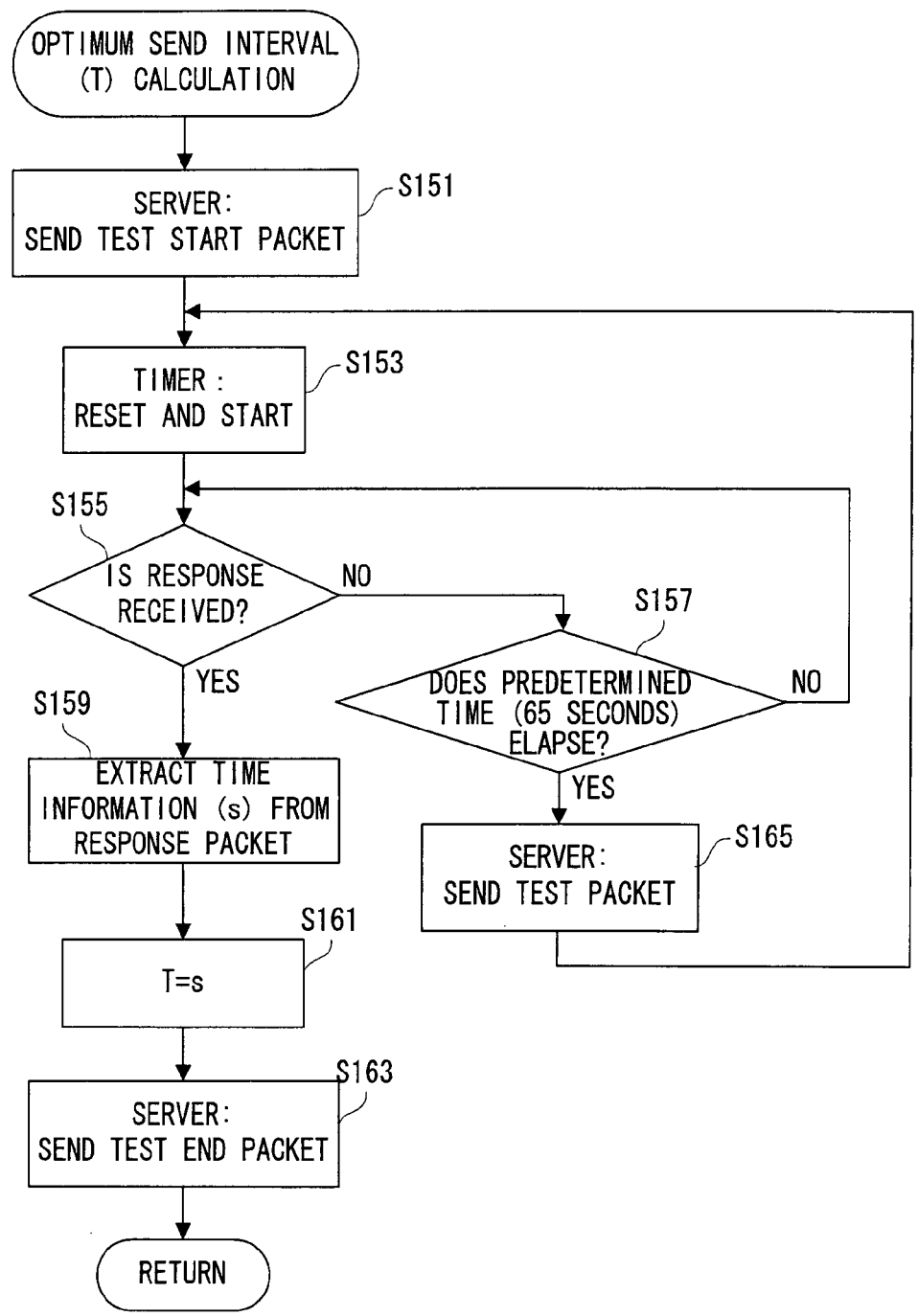
FIG. 12 is a flowchart showing a part of an operation of the client CPU in FIG. 11 embodiment.

The optimum interval (T) calculating processing in the step S31 in FIG. 5 is executed according to a subroutine shown in FIG. 12. With reference to FIG. 12, in a step S151, a test start packet compliant with the UDP is sent to the server 14. In a step S153, the timer is reset and started, and then, the process enters a loop in steps S155 and S157. In the step S155, it is determined whether or not a response packet is received. In the step S157, it is determined whether or not a predetermined time, 65 seconds, for example has elapsed.

If a response packet is received within 65 seconds, "YES" is determined in the step S155, and the process shifts to a step S159. In the step S159, the time information(s) is extracted from the received response packet, and in a step S161, the extracted time information (s) is set in the register "T". Then, in a step S163, a test end packet compliant with the UDP is sent to the server 14, and then, the process is restored to the hierarchical upper level of the routine.

If a response packet is not received after the lapse of 65 seconds, "YES" is determined in the step S157, and the process shifts to a step S165. In the step S165, a test packet is sent to the server 14, and thereafter, the process returns to the step S153.

Figure 13:
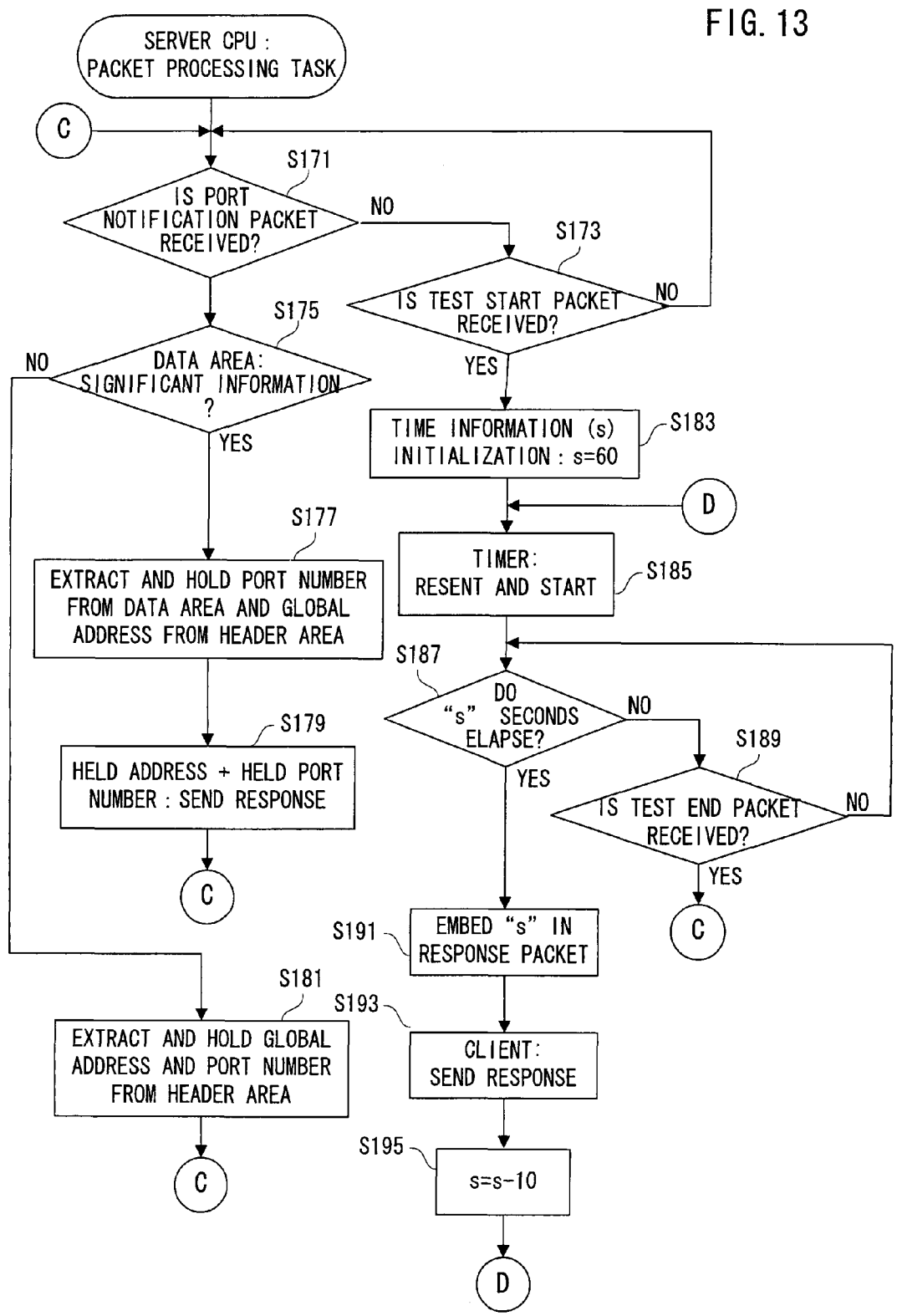
FIG. 13 is a flowchart showing a part of an operation of the server CPU in FIG. 11 embodiment.

With reference to FIG. 13, the processing in steps S171-S181 is the same as that in the steps S101-S111 shown in FIG. 9, and the description thereof is omitted. When a test start packet is received, "YES" is determined in the step S173, and the process shifts to a step S183. In the step S183, the time information (s) is initialized. More specifically, "60" is set to the variable s. Then, in a step S185, the timer is reset and started, and the process enter the loop in steps S187 and S189. In the step S187, it is determined whether or not s seconds have elapsed from receiving of the test start packet by the timer. In the step S189, it is determined whether or not a test end packet is received.

When s seconds have elapsed from receiving of the test start packet, in a step S191, a value of the variable s is embedded in the response packet, in a next step S193, the response packet is sent to the client according to the UDP, and in a step S195, "10," is subtracted from the variable s. Then, the process returns to the step S185.

When a test end packet is received within s seconds from receiving of the test start packet, the process returns to the loop in the steps S171 and S173.

As understood from above, in this embodiment, similar to the above-described embodiment, the Web camera 12 can accept a command at arbitrary timing regardless of the type of the router 16.

In addition, when the router 16 is the UPnP non-compliant type, the Web camera 12 repeatedly sends a test packet for requesting a response to the server 14 through the router 16 while updating the response timing so as to be shortened. In other words, the Web camera 12 repeatedly issues a send request to the router 16 to request the router 16 to send a test packet to the server 14, and the router 16 sends to the server 14 a test packet in response to each send request. Then, the response wait port is temporarily opened in the router 16, and the server 14 sends a response packet in response to the test packet. The response timing is gradually shortened every time that a test packet is received. At this time, the server 14 attaches the time information representative of the waiting time from receiving the test packet to its reply to the response packet to be sent.

At first, the response packet is sent back at timing later for the timing when the response wait port is closed, and therefore, the Web camera 12 cannot receive a response packet. When the response timing is shortened so as to be the timing when the response wait port is closed, the Web camera 12 can receive a response packet. Thus, a time indicated by the time information attached to the response packet first received shall be a send request issuing cycle (=optimum send cycle T).

The Web camera 12 repeatedly issues a send request to the router 16 at a cycle thus determined, that is, the longest cycle within the period (port opening period) during which the router 16 opens the response wait port in response to a send request, that is, the cycle equal to the port opening period or slightly shorter than the cycle. Thus, it is possible to make a state in which the response wait port is continuously opened while reducing a load on the communications line, such as the Internet 20, a LAN, etc.

It should be noted that in this embodiment, the server 14 attaches the time information to a response packet, and the Web camera 12 regards the time indicated by the time information attached to the response packet first received as an information sending request issuing cycle. Alternatively, the Web camera 12 itself counts the elapsed time from the last sending of a test packet to the first receiving of a response packet, and regards the counting result as information sending request issuing cycle.

Next, another embodiment is described. In the above-described FIG. 11-FIG. 13 embodiment, a response packet send-back timing is determined by the server 14 (see step S183 and S195). However, in this embodiment, the client (Web camera 12) may determine this.

Figure 14:
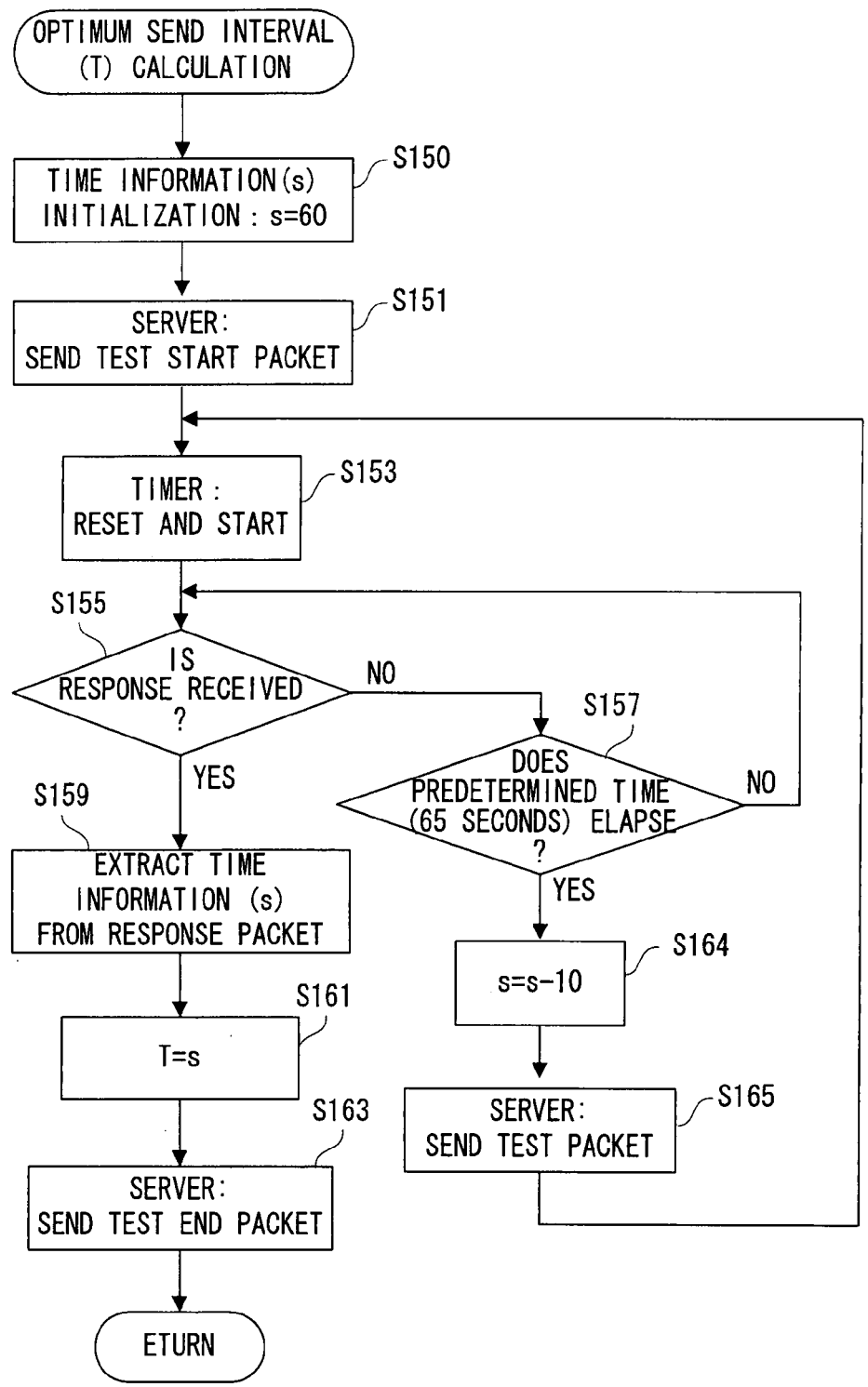
FIG. 14 is a flowchart showing a part of an operation of the client CPU in the other embodiment.
Figure 15:
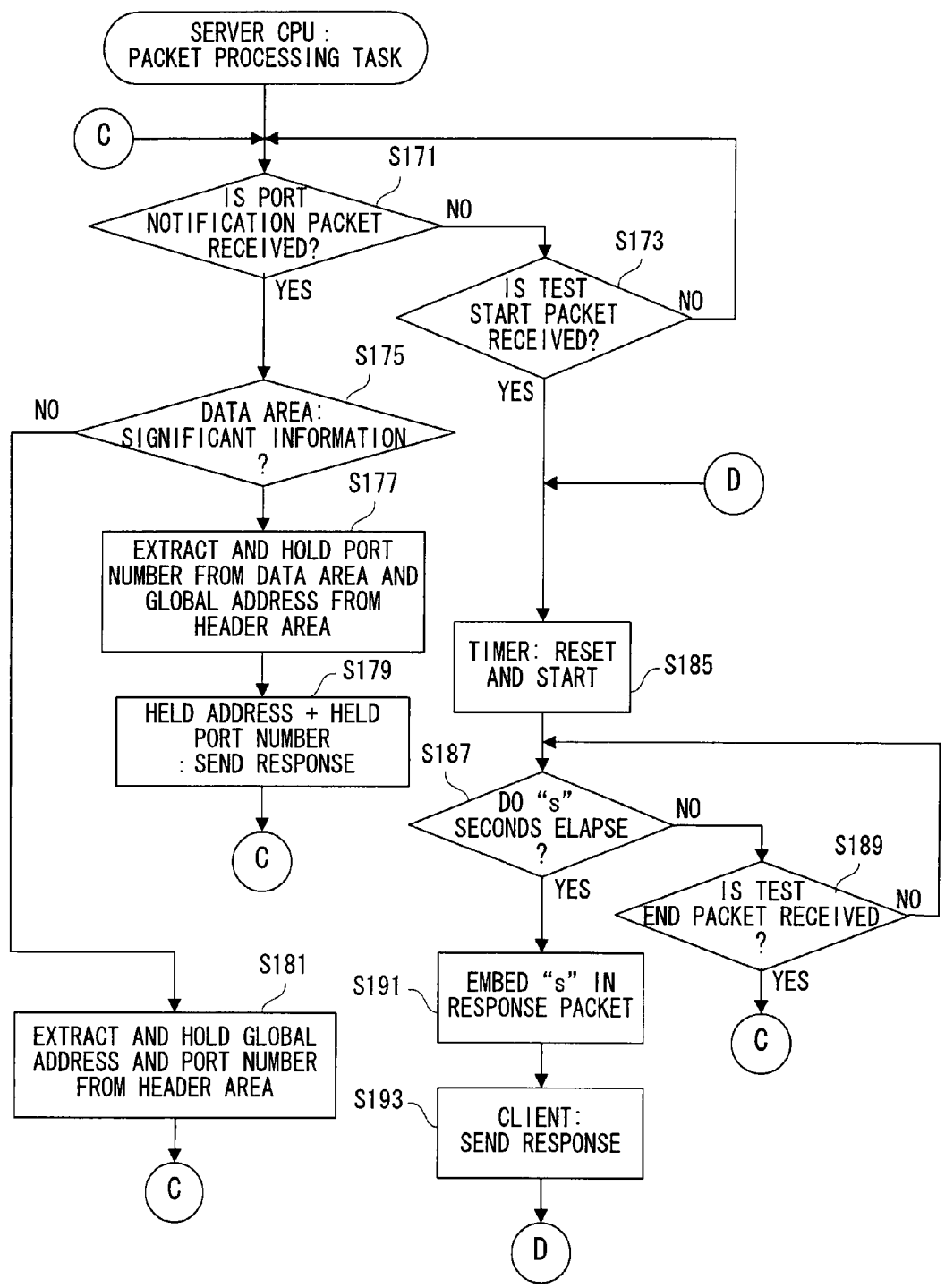
FIG. 15 is a flowchart showing apart of an operation of the server CPU in FIG. 14 embodiment.

FIG. 14 shows an optimum send interval (T) calculating processing on the client side in this embodiment, and FIG. 15 shows a UDP packet processing task on the server 14 shown in this embodiment. The communication process performed between the client and the server itself is the same as the afore-mentioned embodiment, sot that FIG. 11 is aided.

First, with reference to FIG. 11, a test packet to be transmitted from the client to the server 14 includes time information indicative of send-back timing (s=60 seconds, 50 seconds . . . s+10 seconds, s seconds) determined on the side of the client. The server 14 sends back a response packet at the timing according to the time information included in the test packet. In the response packet, the time information representative of the elapsed time from receiving the test packet to its replay, that is, the time information (60 seconds, 50 seconds, . . . , s+10 seconds, s seconds) included in the test packet is described. It should be noted that in this embodiment, because the send-back timing is determined on the side of the client, processing of describing the time information in the response packet by the server 14 may be omitted.

An optimum interval calculating processing by the client in FIG. 14 further includes processing in steps S150 and S164 in FIG. 12. A UDP packet processing task by the server 14 shown in FIG. 15 is the processing in FIG. 13 with the steps S179 and S191 deleted. The steps S150 and S164 added to FIG. 14 correspond to the steps S179 and S191 deleted from FIG. 13.

With reference to FIG. 14, first, in the step S150, time information (s) is initialized. More specifically, "60" is set to the variable s. In a next step S151, a test start packet including the time information (s) is sent. Succeeding steps S153-S157 are similar to the steps S153-S157 in FIG. 12, and thus, the description thereof is omitted. If the determination result in the step S157 is "YES", "10" is subtracted in the step S164, and the test start packet including the time information (s) is sent in a next step S165.

With reference to FIG. 15, steps S171-S181 are the same as the steps S171-S181 in FIG. 13, and thus, the description thereof is omitted. If the determination result in the step S173 is "YES", the process shifts to a step S185 to reset and start the timer. Succeeding steps S187-S193 are the same as the steps in S187-S193 in FIG. 13, and therefore, the description thereof is omitted. Then, after execution of the step S193, the process returns to the step S185.

According to this embodiment, a next advantage can be obtained in addition to that of the above-described embodiments in FIG. 11-FIG. 13. That is, since the response packet send-back timing is determined on the side of the client, it is possible to reduce a processing load on the server 14 especially in a case of a lot of clients.

Additionally, in this embodiment, although the response timing of a response packet is changed so as to be shortened (see step S164), it may be changed so as to be lengthened. In what follows, an embodiment for changing a response timing of a response packet so as to be lengthened is explained by FIG. 16 and FIG. 17.

Figure 16:
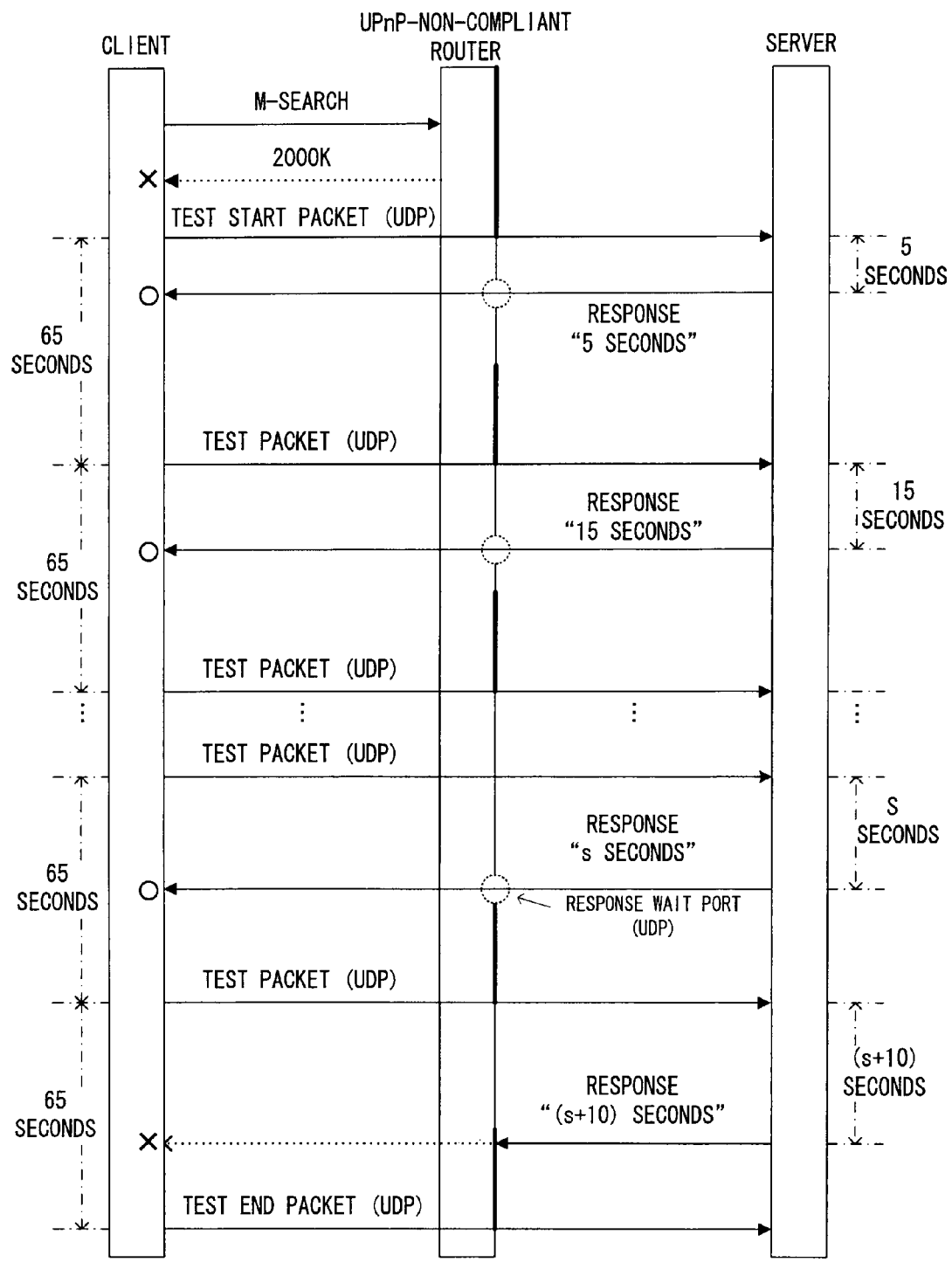
FIG. 16 is a sequence diagram showing a part of the communication process performed in a case that a router is not compliant with UPnP in a further embodiment.

Referring to FIG. 16, a test packet to be sent from the client side (Web camera 12) to the server 14 includes time information representative of the send-back timing (s=5 seconds, 15 seconds, . . . , s seconds, s+10 seconds) determined on the side of the client. The server 14 sends back a response packet at the timing according to the time information included in the test packet. In the response packet, time information indicative of the elapsed time from receiving the test packet and its replay, that is, time information (5 seconds, 15 seconds, . . . , s seconds, s+10 seconds) the same as that included in the test packet is described. Additionally, in this embodiment, the send-back timing is determined on the side of the client, and therefore, the process of describing the time information in the response packet by the server 14 may be omitted.

When a waiting time until the reply is above the port opening time, the Web camera 12 cannot receive a response packet. Thus, the time information "s seconds" extracted from the lastly received response packet is held in the register T of the Web camera 12.

Figure 17:
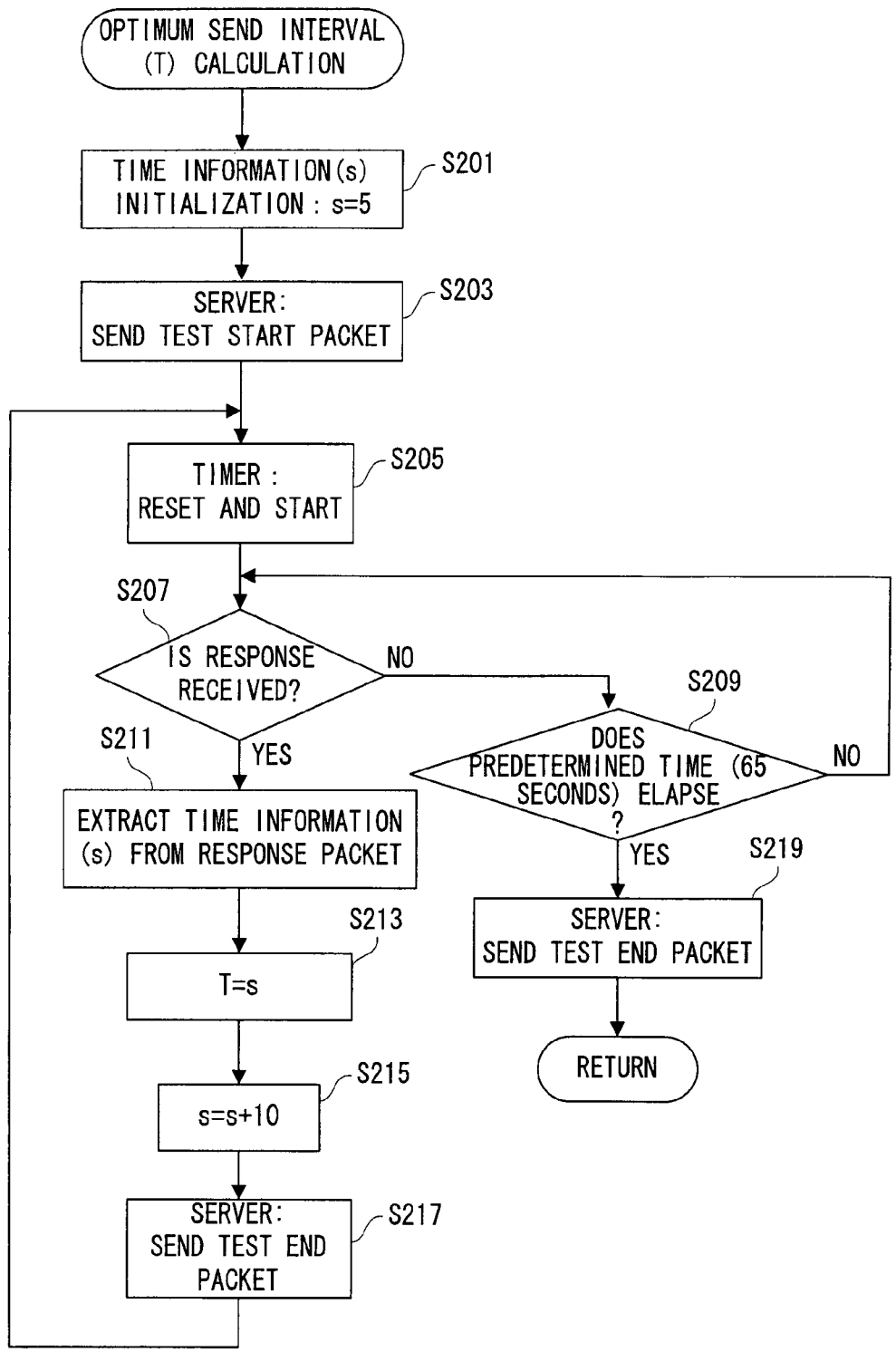
FIG. 17 is a flowchart showing a part of an operation of the client CPU in FIG. 16 embodiment.

The CPU 28 of the Web camera 12 calculates an optimum send interval (T) according to the procedure shown in FIG. 17. With reference to FIG. 17, in a step S201, time information (s) is first initialized. More specifically, "5" is set in the variable s. In a next step S203, a test start packet including the time information (s) is sent. Steps S205-S213 are the same as the steps S153-S159 in FIG. 14, and the description thereof is omitted.

In a step S215, "10" is added to the variable s, and in a next step S217, a test start packet including the time information (s) is sent. Thereafter, the process returns to the step S205.

If "YES" is determined in the step S209, the process shifts to a step S219 to send a test end packet to the server 14. Thereafter, the process is restored to the hierarchical upper level of the routine.

According to this embodiment, a following advantage can be obtained in addition to that of the above-described FIG. 11-FIG. 13 embodiment. That is, the response packet send-back timing is determined on the side of the client, and therefore, it is possible to reduce a processing load of the server 14 especially in a case that a lot of clients exist.

Additionally, in this embodiment, although the response packet send-back timing is determined on the side of the client (Web camera 12), the response packet send-back timing can be determined by the server 14. If the determination of the send-back timing is performed by the server 14, the steps S201 and S215 are deleted from the optimum send interval calculating processing shown in FIG. 17. On the other hand, in the UDP packet processing task of the server 14 shown in FIG. 15, a step corresponding to the deleted step S201 (S183*a*; not shown) is added directly after the step S173, and a step corresponding to the deleted step S215 (S195*a*; not shown) is added directly after the step S193.

In addition, in this embodiment, the response timing is updated at a constant interval (=10) in a lengthening direction, and the time information (s) described in the lastly received response packet is determined to be the optimum send interval (T). However, there is another method of reducing the update interval of the response timing to half of the original (=5) when a state in which a response packet has not yet arrived continues for a predetermined time. In what follows, an embodiment of reducing the update interval of the response timing when a state in which a response packet has not yet arrived continues for a predetermined time is described with reference to FIG. 18-FIG. 20.

Figure 18:
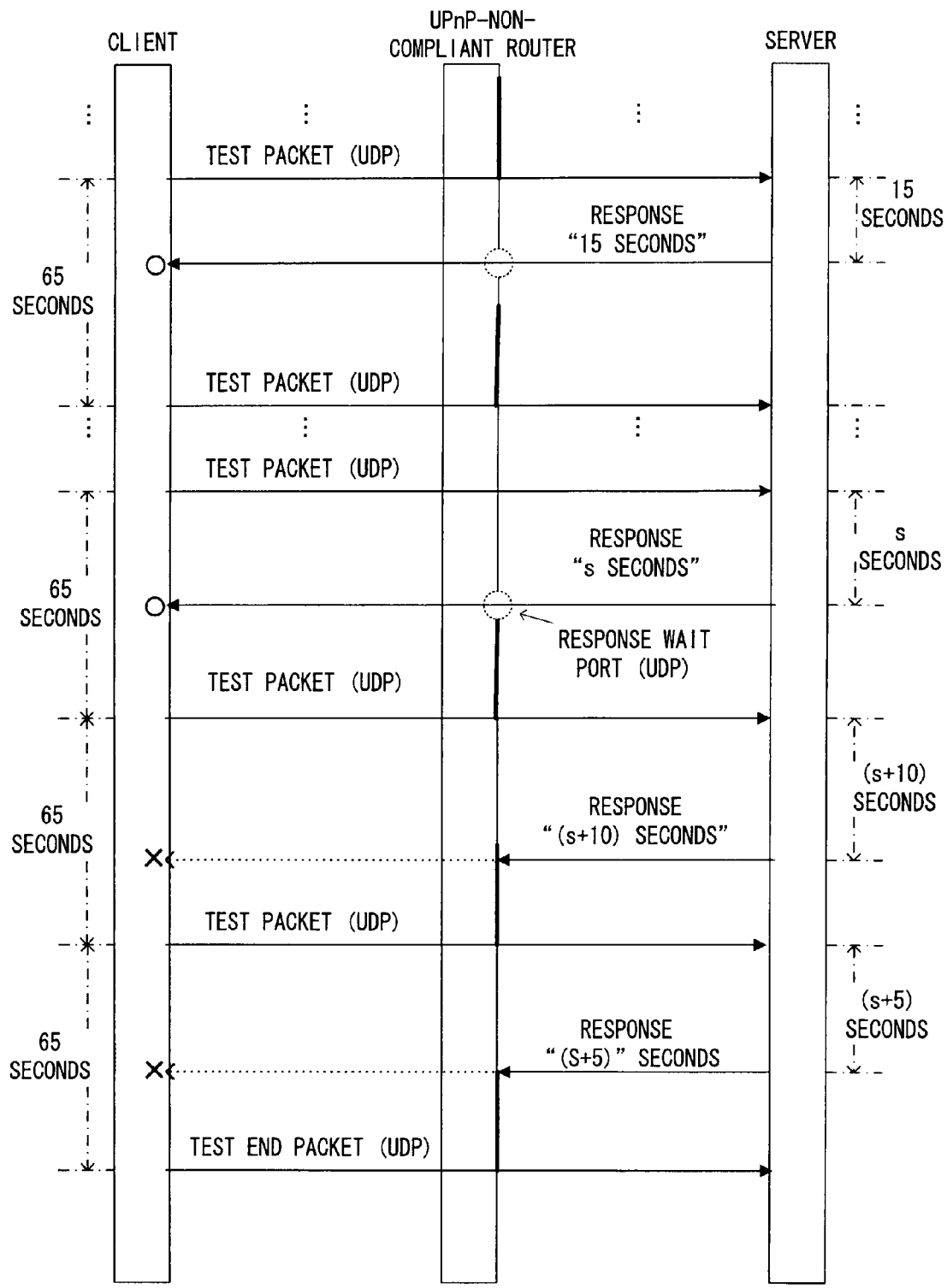
FIG. 18 is a sequence diagram showing a part of a communication process in a case that a router is not compliant with UPnP in another embodiment.

Referring to FIG. 18, the client accepts that a response packet "s+10 seconds" has not yet arrived, and then sends a test packet including time information "s+5 seconds". If the response packet "s+5 seconds" in response thereto is received, time information "s+5 seconds" extracted from the response packet is registered in the register T of the Web camera 12. If the response packet "s+5 seconds" is not received, the time information "s seconds" extracted from the previously received response packet remains to be held in the register T.

Additionally, in a case that the above-described response packet "s+5 seconds" has not yet arrived, a test packet including time information with the update interval further reduced, for example, time information with the update interval reduced to a quarter (=2.5) of the original may further be transmitted.

Figure 19:
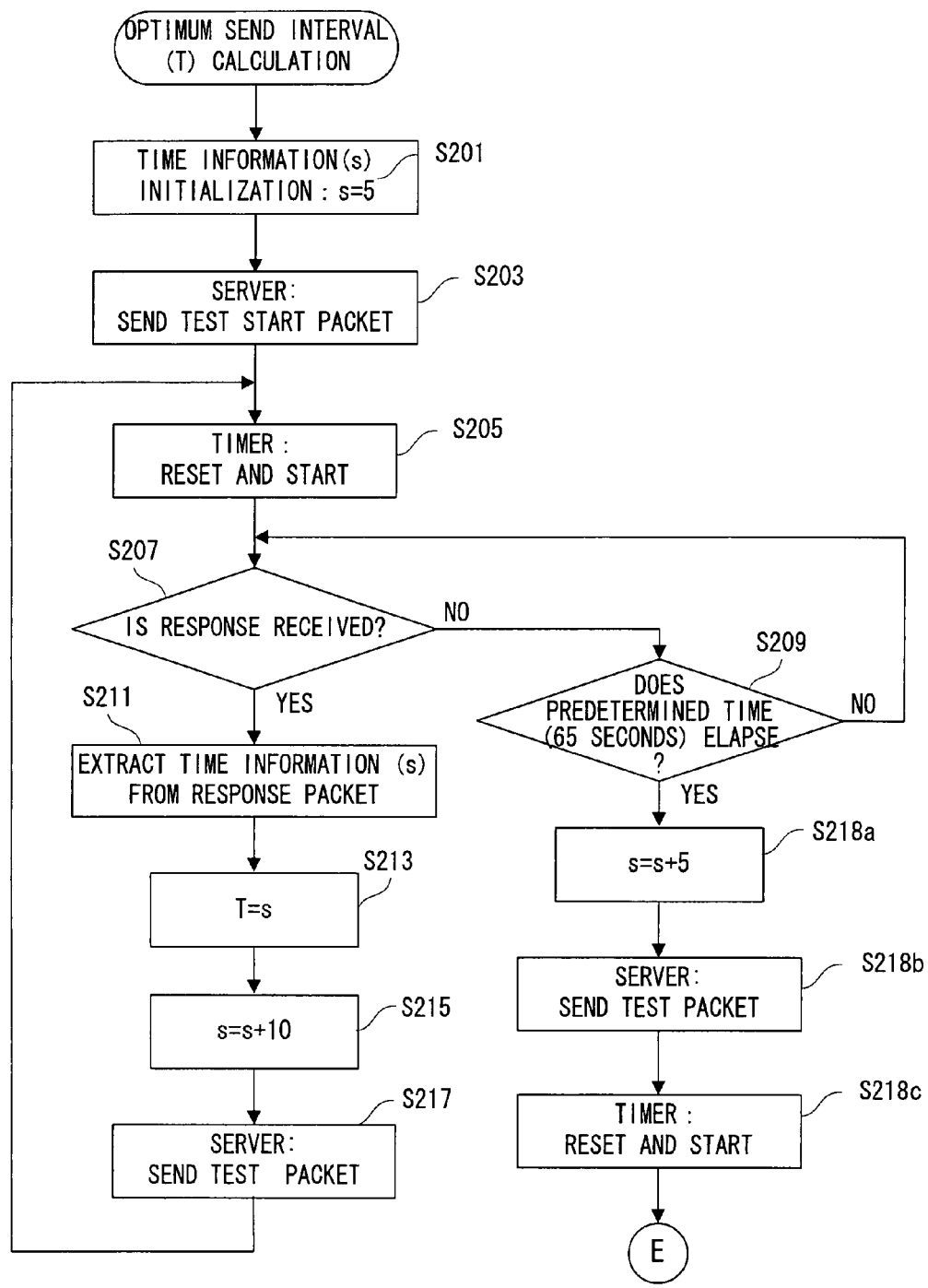
FIG. 19 is a flowchart showing a part of an operation of the client CPU in FIG. 18 embodiment.
Figure 20:
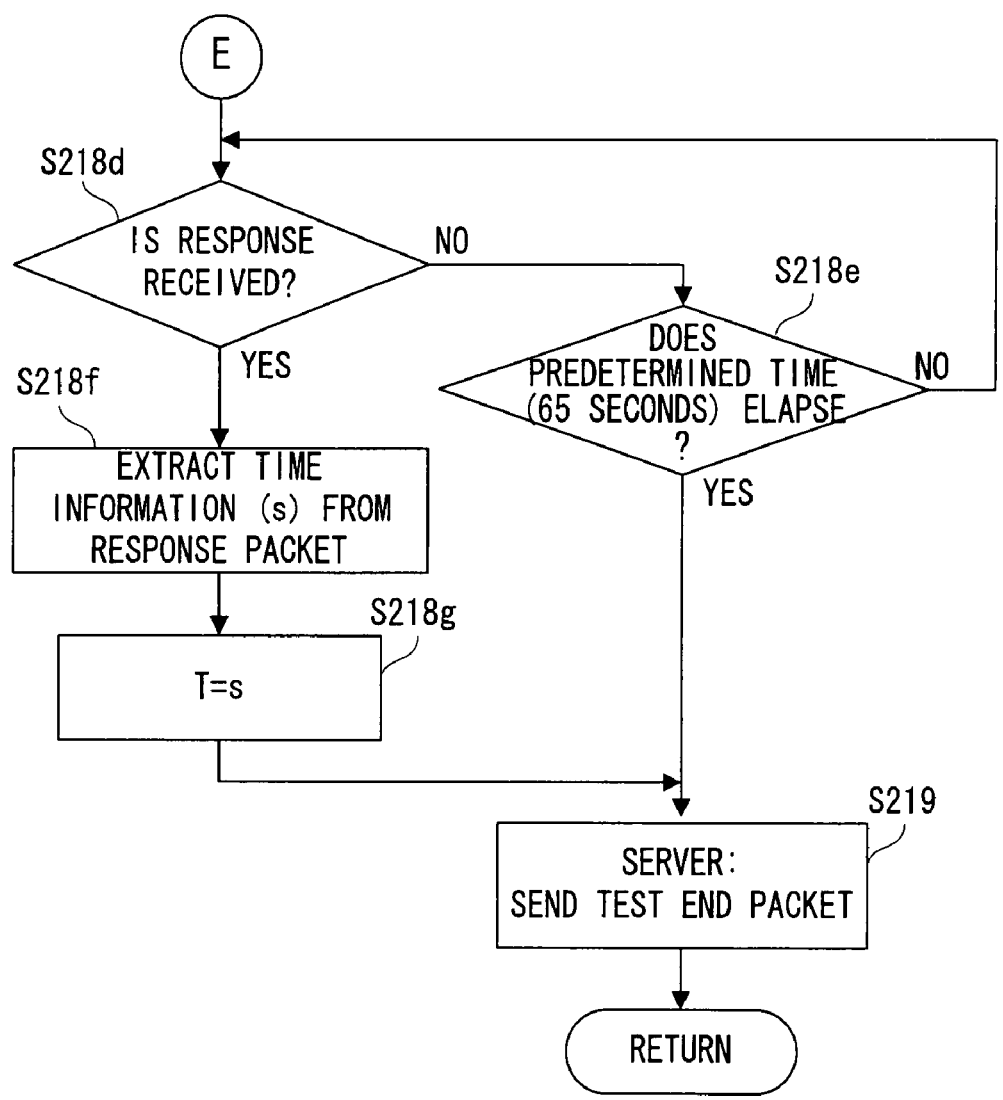
FIG. 20 is a flowchart showing another part of the operation of the client CPU in FIG. 18 embodiment.

The client (CPU 28 of the Web camera 12) calculates an optimum send interval (T) in accordance with a procedure shown in FIG. 19 and FIG. 20. Referring to FIG. 19, steps S201-S219 are the same as the steps S201-S219 in FIG. 17, and therefore, the detailed description is omitted. If "YES" is determined in a step S209, the process shifts to a step S218a to add "5" to the variable s. In a step S218b, a test packet including time information (s) is sent to the server 14. In a step S218c, the timer is reset and started, and then, the process enters a loop of steps S218d and S218e.

Referring to FIG. 20, in the step S218d, it is determined whether or not a response packet is received, and in the step S218e, it is determined whether or not a predetermined time, 65 seconds, for example, has elapsed.

If a response packet is received within 65 seconds, "YES" is determined in the step S218d, and the process shifts to a step S218f. In the step S218f, the time information (s) is extracted from the received response packet, and in a step S218g, the extracted time information (s) is set to the register "T". Then, the process proceeds to a step S219.

If a response packet is not received even after the lapse of 65 seconds, "YES" is determined in the step S218e, and the process shifts to the step S219. In the step S219, a test end packet is sent to the server 14, and then, the process is restored to the hierarchical upper level of the routine.

According to this embodiment, when a state in which a response packet has not yet arrived continues for a predetermined time, by sending a test packet with the update interval of a response timing reduced, it is possible to improve calculation accuracy of the optimum send interval.

With respect to this, in FIG. 11-FIG. 13 embodiment and FIG. 14 and FIG. 15 embodiment, a response timing is updated at a constant interval (=10) in a shortening direction, and the time information (s) described in the firstly received response packet is determined to be the optimum send interval (T), but there also is a method of reducing the update interval of a response timing to half (=5) of the original when a response packet is first received. In what follows, an embodiment of reducing the update interval of a response timing when a response packet is first received is described by FIG. 21-FIG. 23.

Figure 21:
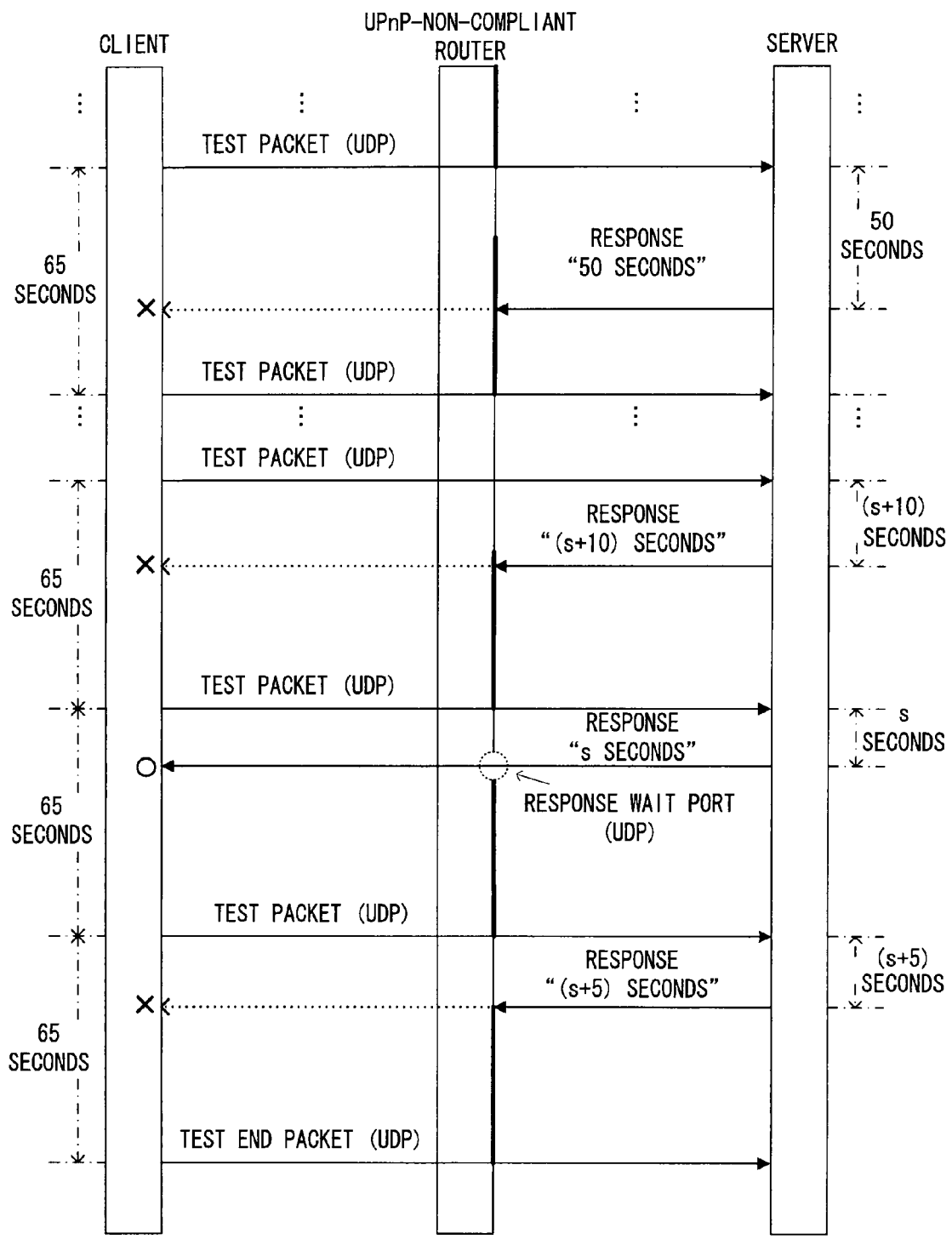
FIG. 21 is a sequence diagram a part of a communication process in a case that a router is not compliant with UPnP in the other embodiment.

Referring to FIG. 21, the client accepts arriving of a response packet "s seconds", and then sends a test packet including the time information "s+5 seconds". If a response packet "s+5 seconds" in response thereto is received, the time information "s+5 seconds" extracted from the response packet is registered in the register T. If the response packet "s+5 seconds" is not received, the time information "s seconds" extracted from the previously received response packet remains to be held in the register T.

Additionally, in a case that the above-described response packet "s+5 seconds" has received, a test packet including time information with the update interval further reduced, for example, time information with the update interval reduced to a quarter (=2.5) of the original may further be sent.

Figure 22:
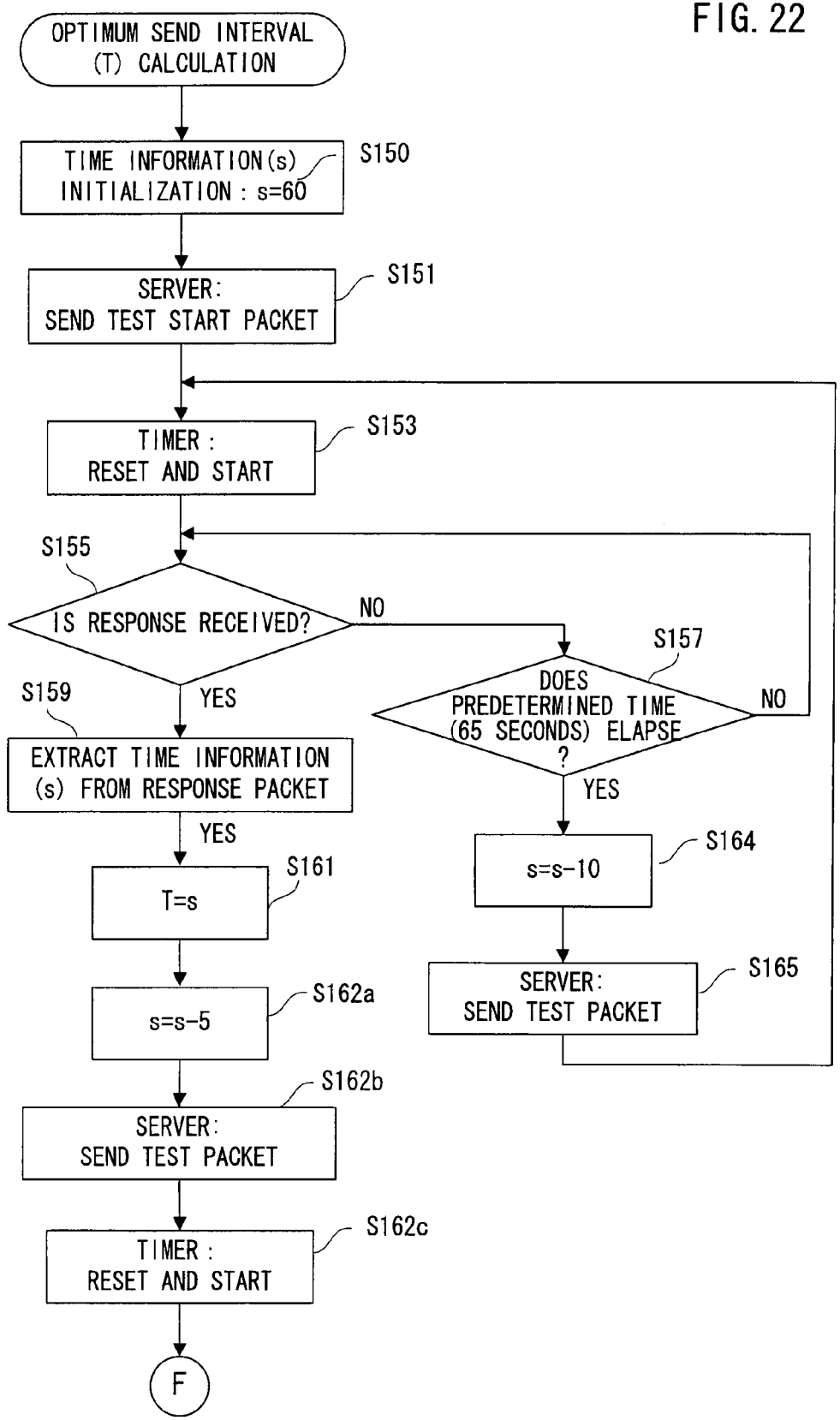
FIG. 22 is a flowchart showing a part of an operation of the client CPU in FIG. 21 embodiment.
Figure 23:
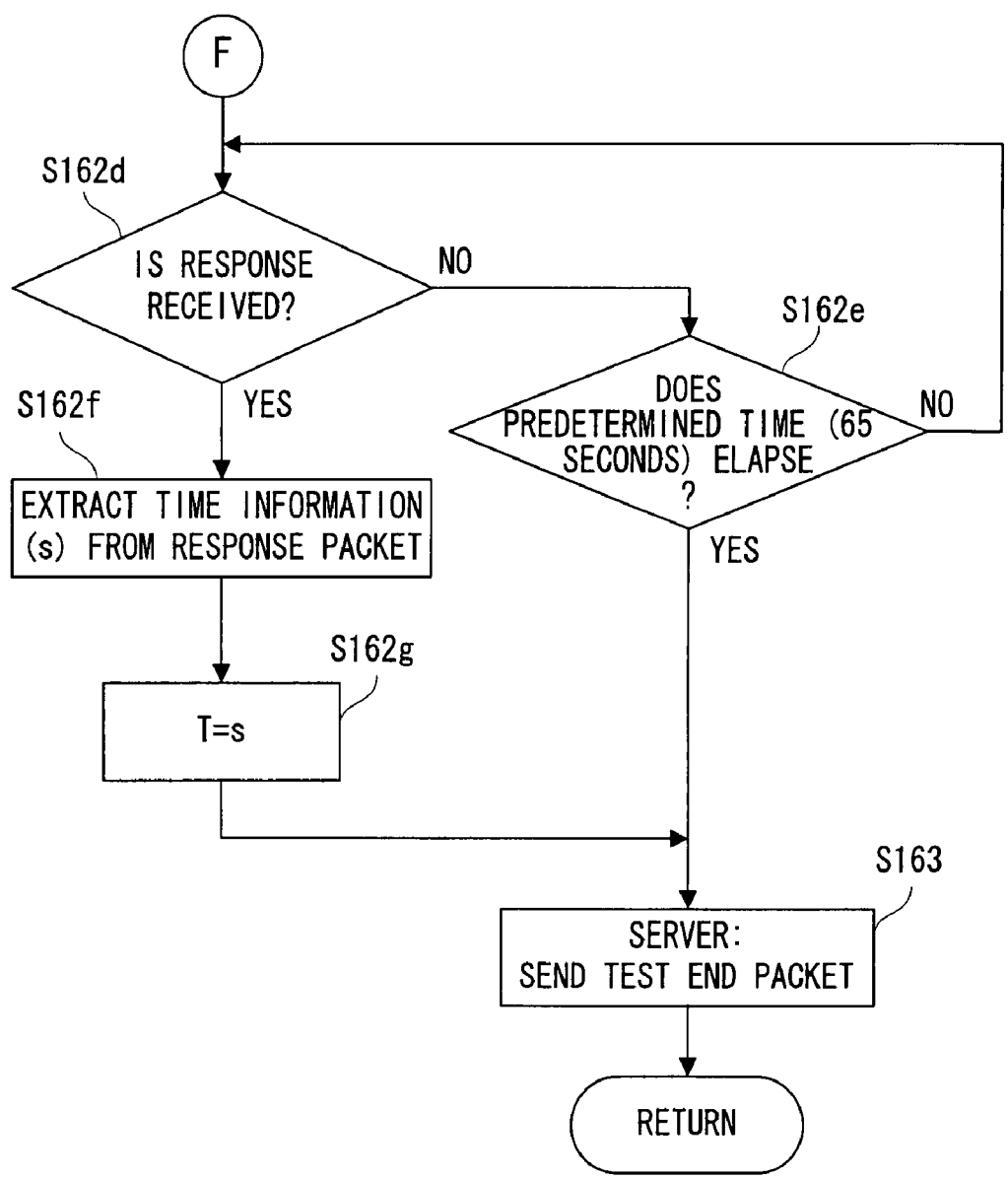
FIG. 23 is a flowchart showing another part of the operation of the client CPU in FIG. 21 embodiment.

The client (the CPU 28 of the Web camera 12) calculates an optimum send interval (T) in accordance with procedure shown in FIG. 22 and FIG. 23. Referring to FIG. 22, steps S150-S161 are the same as the steps S150-S161 shown in FIG. 14, and therefore, the description thereof is omitted. In a step S162a succeeding to the step S161, "5" is subtracted from the variable s. In a step S162b, a test packet including time information (s) is sent to the server 14. In a step S162c, the timer is reset and started, and then, the process enters a loop in steps S162d and S162e.

With reference to FIG. 23, in the step S162d, it is determined whether or not a response packet is received, and in the step S162e, it is determined whether or not a predetermined time, 65 seconds, for example, has elapsed.

If a response packet is received within 65 seconds, "YES" is determined in the step S162d, and the process shifts to a step S162f. In the step S162f, the time information (s) is extracted from the received response packet, and in a step S162g, the extracted time information (s) is set to the register "T". Then, the process proceeds to a step S163.

Even after the 65 seconds have elapsed, if a response packet is not received, "YES" is determined in a step S162e, and then, the process shifts to the step S163. In the step S163, a test end packet is sent to the server 14, and thereafter, the process is restored to the hierarchical upper level of the routine.

According to this embodiment, when a response packet is first received, by sending a test packet with an update interval of the response timing reduced, it is possible to improve calculation accuracy of the optimum send interval.

According to the above, the description is made on the surveillance camera system 10 including the Web camera 12 and the server 14, but the present invention can be applied to any processing systems including an external server and a command processing apparatus for executing processing according to a command notified from an external server through a router.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal connected to a router that when a send request is issued, performs a transmission process in accordance with the request and temporarily releases a receive port, the communication terminal comprising:
    a first issuer issuing to said router a send request to request said router to send an ask signal to ask for a repetitive response to an external server;
    a receiver receiving a response signal from said external server through said receive port in response to the send request issued by said first issuer and
    a determiner determining an issuance cycle of the send request on the basis of the reception result by said receiver;
    wherein said response signal from said external server includes time information representative of a time elapsed from a request receiving time to a response transmitting time, the time information being attached to the response signal by said external server, and
    said determiner determines said issuance cycle on the basis of time information extracted from a most-recent response signal that was lastly received by said receiver.

2. The communication terminal according to claim 1, further comprising a second issuer issuing to said router a send request to request said router to send an ask signal to ask for a stop of a repetitive response to said external server after the determination by said determiner.

3. A communication terminal connected to a router that, when a send request is issued, performs a transmission process in accordance with the request and temporarily releases a receive port, the communication terminal comprising:
    a first issuer repeatedly issuing to said router a send request to request said router to send an ask signal to ask for a response at timings different from each other to an external server;

a receiver receiving a response signal from said external server through said receive port in response to the send request issued by said first issuer; and a determiner determining an issuance cycle of the send request on the basis of the reception result by said receiver;

wherein said response signal from said external server includes time information representative of a time elapsed from a request receiving time to a response transmitting time, the time information being attached to the response signal by said external server, and said determiner determines said issuance cycle on the basis of time information extracted from a most-recent response signal that was lastly received by said receiver.

4. The communication terminal according to claim 3, further comprising an updater updating a response timing asked by said ask signal directed to a lengthening or shortening direction.

5. The communication terminal according to claim 4, wherein the updating direction by said updater is said lengthening direction, and said determiner determines said issuance cycle on the basis of a response signal lastly received by said receiver.

6. The communication terminal according to claim 5, further comprising a reducer reducing an update interval by said updater when a state in which a response signal is not received by said receiver continues during a predetermined time.

7. The communication terminal according to claim 4, wherein the update direction by said updater is said shortening direction, and said determiner determines said issuance cycle on the basis of a response signal first received by said receiver.

8. The communication terminal according to claim 7, further comprising a further reducer reducing the update interval of said updater when a response signal is first received by said receiver.

9. The communication terminal according to claim 3, further comprising a second issuer issuing to said router a send request to request said router to send an ask signal to ask for stop of a response to an external server after the determination by said determiner.

10. The communication terminal according to claim 3, further comprising a third issuer issuing said send request at the issuance cycle according to a determining result by said determiner and said suspender suspending the issuing operation by said third issuer when a communication channel with said external server is disconnected.

11. A control program to be executed in a communication terminal comprising a processor included in the communication terminal that is connected to a router that, when a send request is issued, performs a transmission process in accordance with the request and temporarily releases a receive port, comprising:

an issuing step of issuing to said router a send request to request said router to send an ask signal to ask for a repetitive response to an external server;

a receiving step of receiving a response signal from said external server through said receive port in response to the send request issued by said issuing step, wherein said response signal from said external server includes time information representative of a time elapsed from a request receiving time to a response transmitting time, the time information being attached to the response signal by said external server; and a determining step of determining an issuance cycle of the send request on the basis of the reception result by said receiving step, wherein said determiner determines said issuance cycle on the basis of time information extracted from a most-recent response signal that was lastly received by said receiver.

12. A control program to be executed in a communication terminal comprising a processor included in the communication terminal that is connected to a router that, when a send request is issued, performs a transmission process in accordance with the request and temporarily releases a receive port, comprising:

an issuing step of repeatedly issuing to said router a send request to request said router to send an ask signal to ask for a response at timings different from each other to an external server;

a receiving step of receiving a response signal from said external server through said receive port in response to the send request issued by said issuing step, wherein said response signal from said external server includes time information representative of a time elapsed from a request receiving time to a response transmitting time, the time information being attached to the response signal by said external server; and a determining step of determining an issuance cycle of the send request on the basis of the reception result by said receiving step, wherein said determiner determines said issuance cycle on the basis of time information extracted from a most-recent response signal that was lastly received by said receiver.

13. The communication terminal according to claim 1, wherein the communication terminal comprises a CPU that determines the issuance cycle of the send request by steps including:

sending a test start packet to the server and resetting and starting a timer;

then, repeatedly determining
whether or not a response packet is received and
whether or not a predetermined time has elapsed; and if the response packet is received within the predetermined time interval from resetting and starting the timer, then setting an optimum send interval of the issuance cycle of the send request equal to time information extracted from the received response packet.

14. The communication terminal according to claim 1, further comprising further comprising a third issuer issuing said send request at the issuance cycle, according to a determining result by said determiner and a suspender suspending the issuing operation by said third issuer when a communication channel with said external server is disconnected.

* * * * *